(12) United States Patent
Yokoyama et al.

(10) Patent No.: US 10,444,513 B2
(45) Date of Patent: Oct. 15, 2019

(54) DISPLAY APPARATUS

(71) Applicant: SEIKO EPSON CORPORATION, Tokyo (JP)

(72) Inventors: Osamu Yokoyama, Shiojiri (JP); Takeshi Koshihara, Matsumoto (JP); Kunihiko Yano, Shiojiri (JP); Akira Komatsu, Tatsuno-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/993,760

(22) Filed: May 31, 2018

(65) Prior Publication Data

US 2018/0348523 A1 Dec. 6, 2018

(30) Foreign Application Priority Data

Jun. 1, 2017 (JP) ................................ 2017-109012

(51) Int. Cl.
*G02B 27/01* (2006.01)
*G02B 27/14* (2006.01)
*F21V 8/00* (2006.01)

(52) U.S. Cl.
CPC ........ *G02B 27/0172* (2013.01); *G02B 6/0011* (2013.01); *G02B 27/149* (2013.01); *G02B 2027/0114* (2013.01); *G02B 2027/0125* (2013.01); *G02B 2027/0178* (2013.01)

(58) Field of Classification Search
CPC .. G02B 27/01; G02B 27/017; G02B 27/0101; G02B 27/126; G02B 27/141; G02B 27/0172; G02B 27/0178; G02B 27/283; G02B 2027/0114; G02B 2027/0125; G02B 2027/0178
See application file for complete search history.

(56) References Cited

U.S. PATENT DOCUMENTS

| | | | |
|---|---|---|---|
| 6,882,379 B1 * | 4/2005 | Yokoyama | G02B 27/1033 349/61 |
| 8,552,926 B2 * | 10/2013 | Hayashibe | G02B 26/101 345/7 |
| 2004/0021833 A1 | 2/2004 | Koide | |
| 2010/0142015 A1 * | 6/2010 | Kuwahara | G02B 5/32 359/3 |
| 2014/0347736 A1 * | 11/2014 | Liu | G02B 27/0172 359/630 |
| 2015/0144908 A1 * | 5/2015 | Yoon | H01L 27/3216 257/40 |

(Continued)

FOREIGN PATENT DOCUMENTS

| | | |
|---|---|---|
| JP | 2000-066301 A | 3/2000 |
| JP | 2004-062108 A | 2/2004 |
| JP | 2016-042136 A | 3/2016 |

*Primary Examiner* — Sultan Chowdhury
(74) *Attorney, Agent, or Firm* — Oliff PLC

(57) ABSTRACT

A dichroic prism synthesizes display light emitted from a plurality of display panels, and a plate-shaped light guiding section guides the synthesized light to a light-emitting section. In the display light emitted from the respective pixels of the display panel, although a radiation angle of an effective luminous flux which reaches the eye of an observer is large in a direction corresponding to the vertical direction, a range of incident angle of intersecting effective luminous fluxes to the dichroic mirror is small.

7 Claims, 15 Drawing Sheets

(56) References Cited

U.S. PATENT DOCUMENTS

2017/0219830 A1    8/2017  Komatsu et al.
2017/0299956 A1*  10/2017  Holland .................. G03B 21/62
2017/0336222 A1*  11/2017  Yamaguchi ............... B60R 1/00

* cited by examiner

FIG. 7
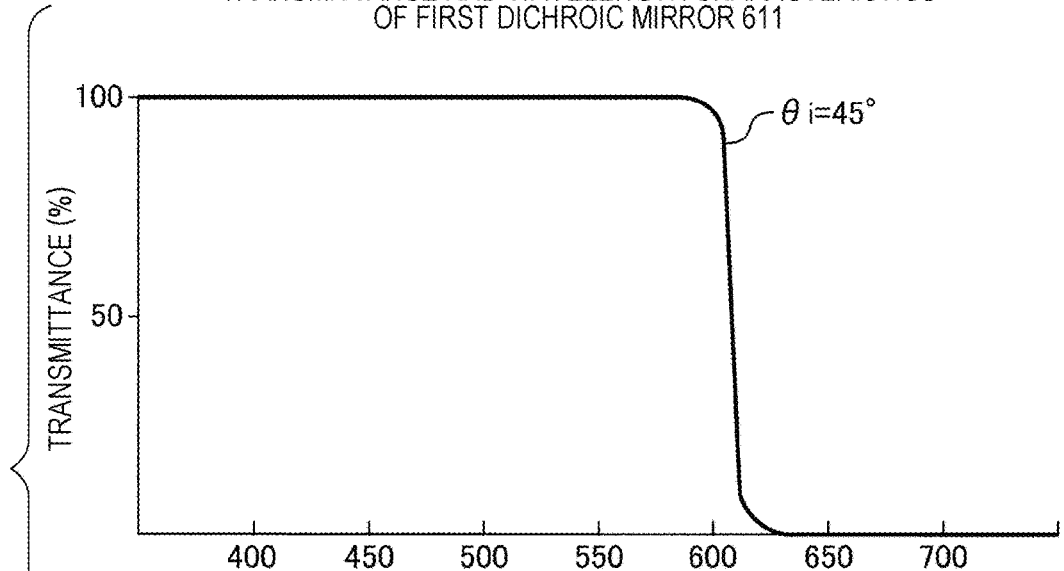
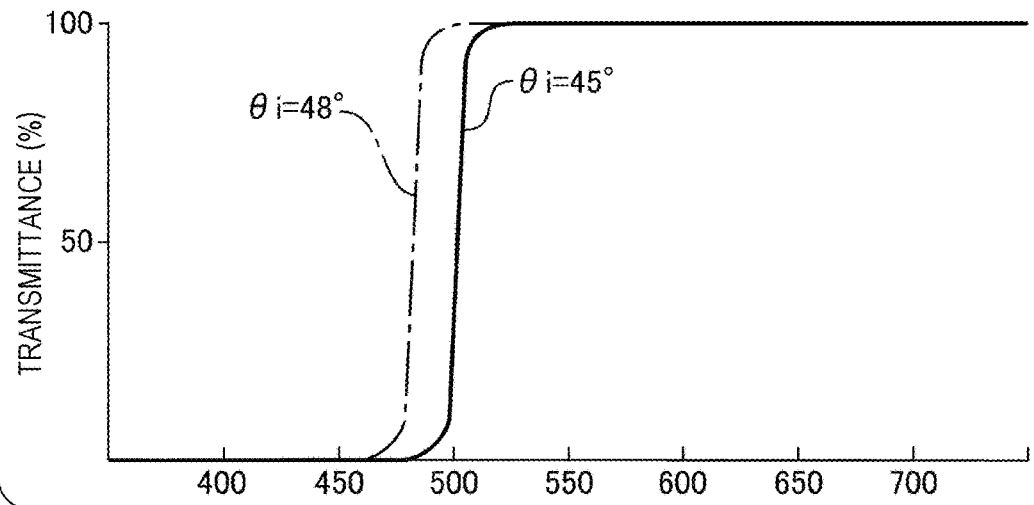

DISPLAY APPARATUS

BACKGROUND

1. Technical Field

The present invention relates to display apparatuses.

2. Related Art

A head-mount type display apparatus has been proposed in which display light emitted from a display panel such as a liquid crystal display panel, an organic electroluminescence display panel, or the like is guided from the first end to the second end in the first direction by a parallel light guiding body (light guiding section) and emitted in the first direction so that the display light is directed to a second direction, which is perpendicular to the first direction. JP-A-2016-42136 is an example of related art.

On the other hand, a projection type display apparatus which includes a plurality of display panels having a plurality of pixels each of which are provided with light-emitting elements such as electroluminescence elements, organic electroluminescence elements, and the like, and a dichroic prism, wherein display light emitted from a plurality of display panels are projected via a projection optical system after being synthesized by a dichroic prism. JP-A-2000-066301 and JP-A-2004-062108 are examples of related art.

As the display apparatus described in JP-A-2016-42136, when a display light emitted from only one display panel is guided to allow an observer to recognize an image, there is difficulty in recognizing a bright image. On the other hand, as shown in a reference example, which is illustrated in FIGS. 14, 15, and 16 as a perspective view, a plan view, and a side view, respectively, a bright image is expected to be recognized by applying a plurality of display panels 20 such as organic electroluminescence display panels (a configuration using a display panel 20 (R) for red color, a display panel 20 (G) for green color, a display panel 20 (B) for blue color (configuration described in JP-A-2000-066301 and JP-A-2004-062108)) to the display apparatus described in JP-A-2016-42136.

In FIGS. 14, 15, and 16, portions corresponding to red, green, and blue light are indicated by (R), (G), and (B). In addition, in FIGS. 15 and 16, in a display light L from each display panel 20, only an effective luminous flux La that is incident on an eye E of an observer is illustrated as an image light L0. Further, in the illustration of effective luminous flux La, the effective luminous flux La emitted from the pixels at the center of the display panel 20 is indicated by the solid line, the effective luminous flux La emitted from the pixels on one end of the display panel 20 is indicated by the long dotted line, and the effective luminous flux La emitted from the pixels on the other end of the display panel 20 is indicated by the dotted line. Further, in FIGS. 14, 15, and 16, the arrow which indicates the direction corresponding a horizontal direction H of the image and the arrow which indicates the direction corresponding a vertical direction V of the image are also indicated for the display panel 20.

In a display apparatus 100' of a reference example shown in FIG. 14, FIG. 15, and FIG. 16, since a dichroic prism 61 and a display panel 20 are positioned such that a first dichroic mirror 611 and a second dichroic mirror 612 intersect with each other as viewed in the first direction X, there is a problem that the utilization efficiency of the display light is decreased for the reasons described below.

First, since the transmissivity and reflectivity of the first dichroic mirror 611 and the second dichroic mirror 612 have incident angle dependence, the dielectric multilayer which constitutes the first dichroic mirror 611 and the second dichroic mirror 612 is designed in a film configuration or the like on the assumption that the incident angle $\theta i$ of 45°. On the other hand, the display light L emitted from the respective pixels of the display panel 20 incident on a light guiding section 50 via a light-incident section 40 after the lights corresponding to each color are synthesized by a dichroic prism 61 into a synthesized light Lb. Then, the synthesized light Lb is directed in the light guiding section 50 from the first end 51 to the second end 52 in the first direction X while being reflected between the first surface 56 and the second surface 57 which face in the second direction Z and emitted from the light-emitting section 58 toward the first side Z1 in the second direction Z. Accordingly, an observer can recognize an image of the horizontal direction H extending in the first direction X and the vertical direction V extending in the third direction Y. In the display light L emitted from the respective pixels of the display panel 20, although the radiation angle in the direction corresponding to the horizontal direction H of the image is equal to the radiation angle in the direction corresponding to the vertical direction V of the image, the display light L is limited in the direction corresponding to the horizontal direction H of the image by the thickness or the like of the light guiding section 50 in the second direction Z, which causes only a small range of the radiation angle $\theta h$ of the display light L to reach the eye E of an observer. On the other hand, the display light L is not limited in the direction corresponding to the third direction Y (the vertical direction V of the image) by the thickness or the like of the light guiding section 50 in the second direction Z, which causes a wide range of the radiation angle $\theta v$ of the light to reach the eye E of an observer. As a result, in the display light L, an effective luminous flux La is incident on the eye E of an observer as an image light L0, and in the effective luminous flux La, the radiation angle $\theta v$ corresponding to the vertical direction V of the image is larger than the radiation angle $\theta h$ corresponding to the horizontal direction H of the image.

Consequently, when the first dichroic mirror 611 and the second dichroic mirror 612 are positioned to intersect each other as viewed in the first direction X, the effective luminous flux La has a wide range of incident angle to the first dichroic mirror 611 and the second dichroic mirror 612 in the direction corresponding to the vertical direction V (direction in which the radiation angle effectively used (effective radiation angle) is large), and has a large deviation from 45°. For example, as shown in FIG. 17, the effective luminous flux La (R) has a wide range of incident angle to the first dichroic mirror 611 in the direction corresponding to the vertical direction V (direction in which the radiation angle effectively used (effective radiation angle) is large), and has a large deviation from 45°. Accordingly, the direction in which the radiation angle is effectively used in a wide range (direction corresponding to the vertical direction V of the image) is effected by incident angle dependence to a large degree, and thus the light utilization efficiency is decreased.

In particular, the display panel 20, which is configured such that each of a plurality of pixels has an organic electroluminescence element, emits nonpolarized light. Accordingly, since the polarization dependence of the first dichroic mirror 611 and the second dichroic mirror 612 are required to be taken into account, it is difficult to decrease the incident angle dependence of the first dichroic mirror 611 and the second dichroic mirror 612.

SUMMARY

An advantage of some aspects of the invention is that a display apparatus that improves light utilization efficiency in a configuration in which display light emitted from a plurality of display panels is emitted via a synthesis optical system and a plate-shaped light guiding section is provided.

According to an aspect of the present invention, a display apparatus includes: a first display panel having a plurality of pixels and configured to emit nonpolarized first display light; a second display panel having a plurality of pixels and configured to emit nonpolarized second display light in a wavelength range different from that of the first display light; a synthesis optical system which includes a first dichroic mirror that passes one of the first display light emitted from the first display panel and the second display light emitted from the second display panel and reflects the other to thereby synthesize the first display light and the second display light; and a plate-shaped light guiding section which has a first surface extending from a first end to a second end in a first direction and a second surface facing the first surface on a first side in a second direction, which is perpendicular to the first direction, and extending from the first end to the second end in the first direction, and is configured to guide synthesized light emitted from the synthesis optical system to be directed from the first end to the second end in the first direction while reflecting the synthesized light between the first surface and the second surface, and to be emitted from the light-emitting section toward the first side in the second direction, wherein the first dichroic mirror is positioned obliquely to a light-emitting surface of the first display panel and a light-emitting surface of the second display panel as viewed in a third direction, which is perpendicular to the first direction and the second direction.

In the present invention, the first display light emitted from the first display panel and the second display light emitted from the second display panel are synthesized by the first dichroic mirror so that an image can be recognized by an observer. Accordingly, a bright image can be recognized by an observer. Further, since the first display light and the second display light are limited by a thickness or the like of the light guiding section in the second direction, the radiation angle corresponding to the third direction of the image is larger than the radiation angle corresponding to the first direction of the image in the effective luminous flux incident on the eye of an observer as image light. In view of the above, in the present invention, the first dichroic mirror is positioned obliquely to a light-emitting surface of the first display panel and a light-emitting surface of the second display panel as viewed in the third direction. As a consequence, the effective luminous flux has a small range of incident angle to the first dichroic mirror in the direction corresponding to the third direction (direction in which the radiation angle effectively used (effective radiation angle) is large). Accordingly, since the effective luminous flux is less likely affected by the incident angle dependence of the first dichroic mirror in the direction in which the radiation angle is effectively used in a wide range, the light utilization efficiency can be improved. In particular, in the case where the display panel emits nonpolarized light, it is difficult to decrease the incident angle dependence of the first dichroic mirror since the polarization dependence of the first dichroic mirror is required to be taken into account. However, according to the present invention, the degree effected by the incident angle dependence is small, which ensures high light utilization efficiency.

In the present invention, a configuration is possible in which the display apparatus includes a third display panel having a plurality of pixels and configured to emit nonpolarized third display light in a wavelength range different from that of the first display light and the second display light, wherein the synthesis optical system includes a second dichroic mirror that passes one of the second display light and the third display light emitted from the third display panel and reflects the other to thereby synthesize the second display light and the third display light, and the second dichroic mirror is positioned obliquely to a light-emitting surface of the second display panel and a light-emitting surface of the third display panel as viewed in the third direction. With this configuration, in each of the first display light, the second display light, and third display light, the effective luminous flux which reaches the eye of an observer has a small range of incident angle to the first dichroic mirror and the second dichroic mirror in the direction corresponding to the third direction (direction in which the radiation angle used (effective radiation angle) is large). Accordingly, since the effective luminous flux is less likely affected by the incident angle dependence of the first dichroic mirror and the second dichroic mirror in the direction in which the radiation angle is effectively used in a wide range, the light utilization efficiency can be improved. Further, considering the polarization dependence of the second dichroic mirror, it is quite difficult to decrease the incident angle dependence of the second dichroic mirror. However, according to the present invention, the degree effected by the incident angle dependence is small, which ensures high light utilization efficiency.

In the present invention, a configuration is possible in which the synthesis optical system is a dichroic prism in which the first dichroic mirror and the second dichroic mirror are positioned to intersect with each other, and the first dichroic mirror reflects the first display light and passes the second display light and the third display light, and the second dichroic mirror reflects the third display light and passes the first display light and the second display light.

In the present invention, a configuration is possible in which the first dichroic mirror forms an angle of 45° to the light-emitting surface of the first display panel as viewed in the third direction, and the second dichroic mirror forms an angle of 45° to the light-emitting surface of the third display panel as viewed in the third direction.

In the present invention, a configuration is possible in which at least one of the angle formed between the first dichroic mirror and the light-emitting surface of the first display panel as viewed in the third direction and the angle formed between the second dichroic mirror and the light-emitting surface of the third display panel as viewed in the third direction is less than 45°. In the present invention, a configuration is possible in which both the angle formed between the first dichroic mirror and the light-emitting surface of the first display panel as viewed in the third direction and the angle formed between the second dichroic mirror and the light-emitting surface of the third display panel as viewed in the third direction are less than 45°. With this configuration, in each of the first display light, the second display light, and third display light, the effective luminous flux which is incident on the eye of an observer as an image light has a small range of incident angle to the first dichroic mirror and the second dichroic mirror in the direction in which the radiation angle effectively used (effective radiation angle) is small. Accordingly, since the effective luminous flux is less likely affected by the incident angle dependence in the direction in which the radiation angle is effectively used in a wide range, the light utilization efficiency can be improved.

In this case, a configuration is possible in which the dichroic prism includes a first light-incident surface formed parallel with the light-emitting surface of the first display panel and allows the first display light to be incident, a second light-incident surface formed parallel with the light-emitting surface of the second display panel and allows the second display light to be incident, a third light-incident surface formed parallel with the light-emitting surface of the third display panel and allows the third display light to be incident, and a light-emitting surface formed parallel with the second light-incident surface with a dimension of the first direction being smaller than a dimension of the second light-incident surface, wherein the dichroic prism has a trapezoid shape with the first light-incident surface and the third light-incident surface being inclined to the second light-incident surface and the light-emitting surface as viewed in the third direction. With this configuration, as viewed in the third direction, a configuration in which an angle formed between the first dichroic mirror and the light-emitting surface of the first display panel and an angle formed between the second dichroic mirror and the light-emitting surface of the third display panel are less than 45° can be readily achieved.

In the present invention, a configuration is possible in which, in the synthesized light emitted from the light-emitting section, a luminous flux of light emitted from one pixel in the first display panel or the second display panel has an equal diameter in two directions perpendicular to each other.

In the present invention, a configuration is possible in which each of the plurality of pixels has an organic electroluminescence element.

When the display apparatus according to the present invention is used as a head mount type display apparatus or the like, a configuration is possible in which the first direction is a left-right direction, the second direction is a front-back direction, and the third direction is an up-down direction. Further a configuration is also possible in which the first direction is an up-down direction, the second direction is a front-back direction, and the third direction is a left-right direction.

BRIEF DESCRIPTION OF THE DRAWINGS

The invention will be described with reference to the accompanying drawings, wherein like numbers reference like elements.

FIG. 7 is an explanatory view which schematically shows optical properties of the dichroic prism shown in FIG. 2 and the like.

DESCRIPTION OF EXEMPLARY EMBODIMENTS

Figure 1:
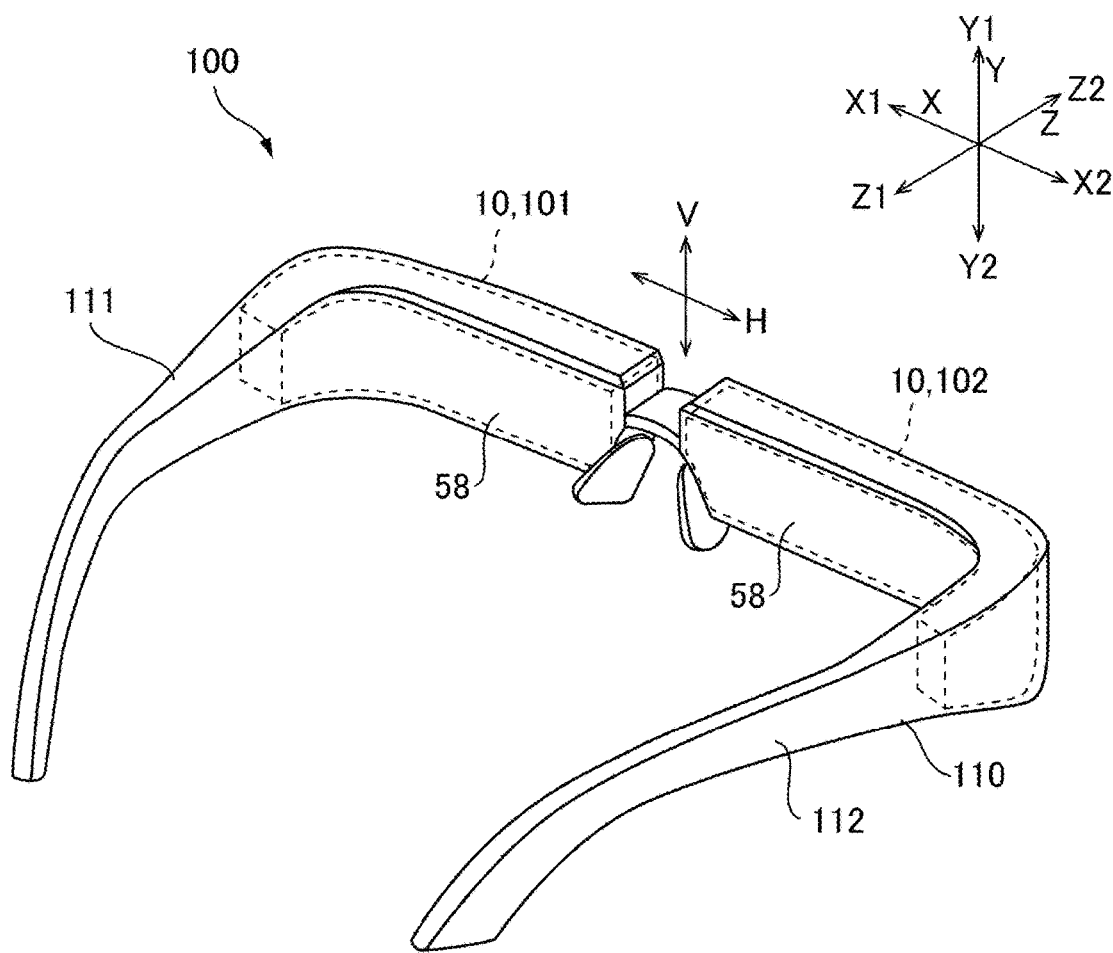
FIG. 1 is a schematic explanatory view of an example of an outer appearance of a display apparatus according to Embodiment 1 of the present invention.

Embodiment of the present invention will be described below. Throughout the drawings referred to in the following description, the number and scale of layers and members may be different for ease of recognition in the drawings.

Embodiment 1

Overall Configuration

FIG. 1 is a schematic explanatory view of an example of an outer appearance of a display apparatus 100 according to Embodiment 1 of the present invention. The display apparatus 100 shown in FIG. 1 is provided as a head mount type display apparatus such as a see-through eyeglass display and includes a frame 110 having temples 111 and 112 on the left and right sides. In the display apparatus 100, display sections 10, which will be described later, are supported by the frame 110 so as to allow a user to recognize an image emitted from the display sections 10 as a virtual image. In the present embodiment, the display apparatus 100 includes a display section 101 for the left eye and a display section 102 for the right eye as a display section 10. The display section 101 for the left eye and the display section 102 for the right eye have the same configuration and are symmetrically arranged on the left and right sides.

The following description will be focused on the display section 101 for the left eye, and the description of the display section 102 for the right eye will be omitted. Further, in the following description, the left-right direction is defined as a first direction X, the front-back direction is defined as a second direction Z, and the up-down direction is defined as a third direction Y. Further, in the description, a first side (left side) in the first direction X is designated as X1, a second side (right side) in the first direction X is designated as X2, a first side (back side) in the second direction Z is designated as Z1, a second side (front side) in the second direction Z is designated as Z2, a first side (upper side) in the third direction Y is designated as Y1, and a second side (lower side) in the third direction Y is designated as Y2. Since the display section 101 for the left eye and the display section 102 for the right eye are symmetrically arranged, the display section 101 for the left eye and the display section 102 for the right eye are horizontally inverted on the first side X1 and the second side X2 in the first direction X.

Overall Configuration of Display Section 10

Figure 2:
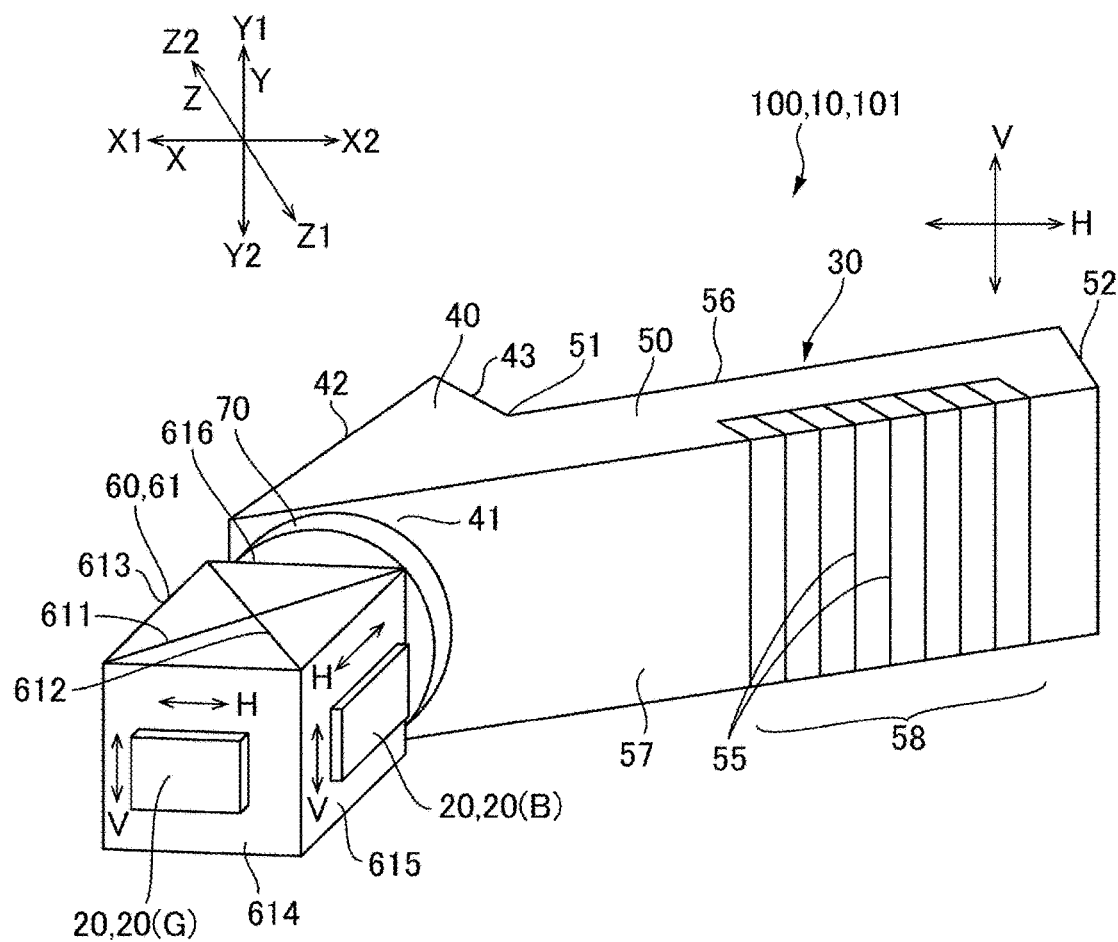
FIG. 2 is a schematic perspective view which illustrates a configuration of an optical system of a display section shown in FIG. 1.
Figure 3:
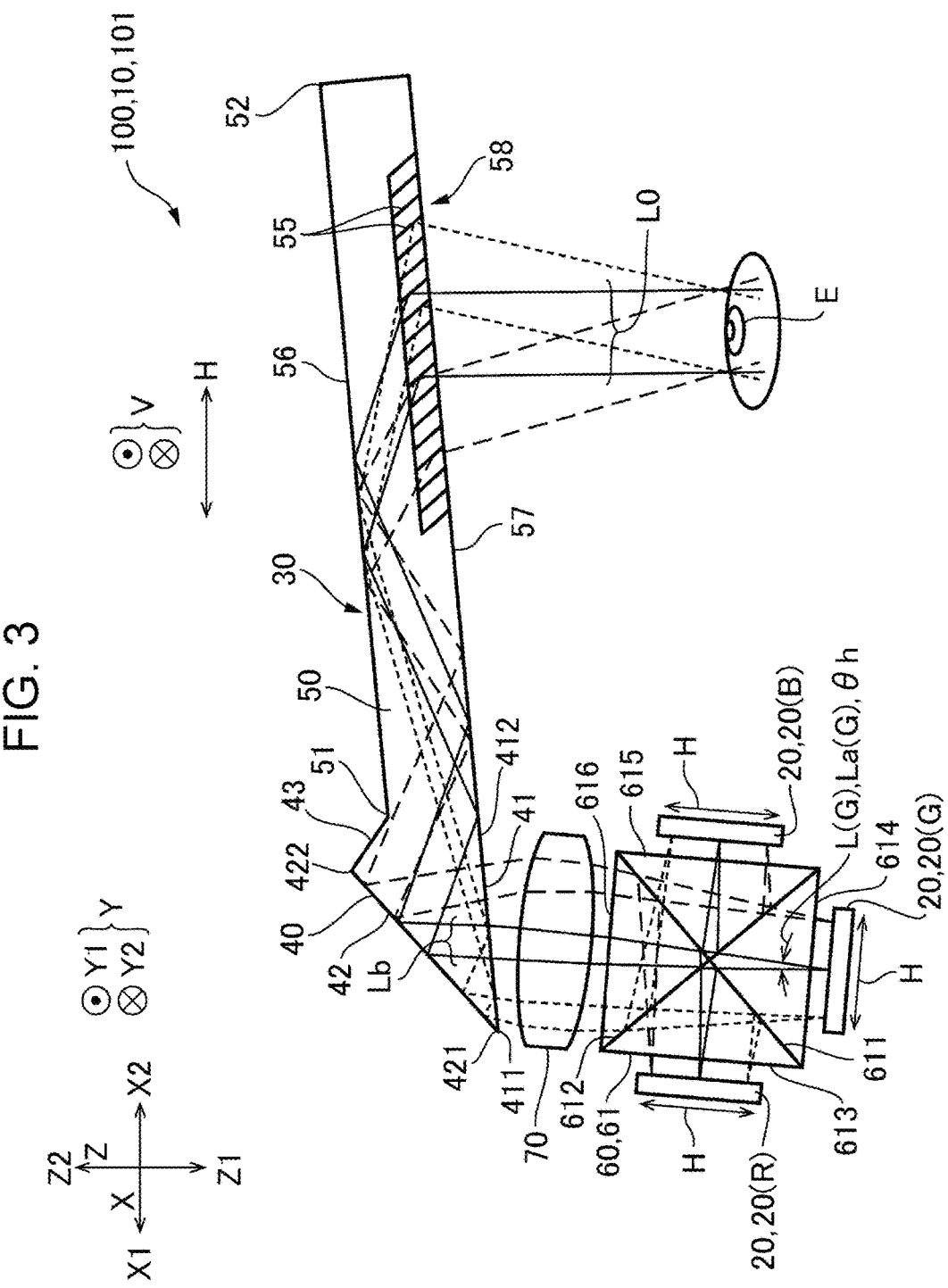
FIG. 3 is a plan view of the display section shown in FIG. 2 as viewed in a third direction.
Figure 4:
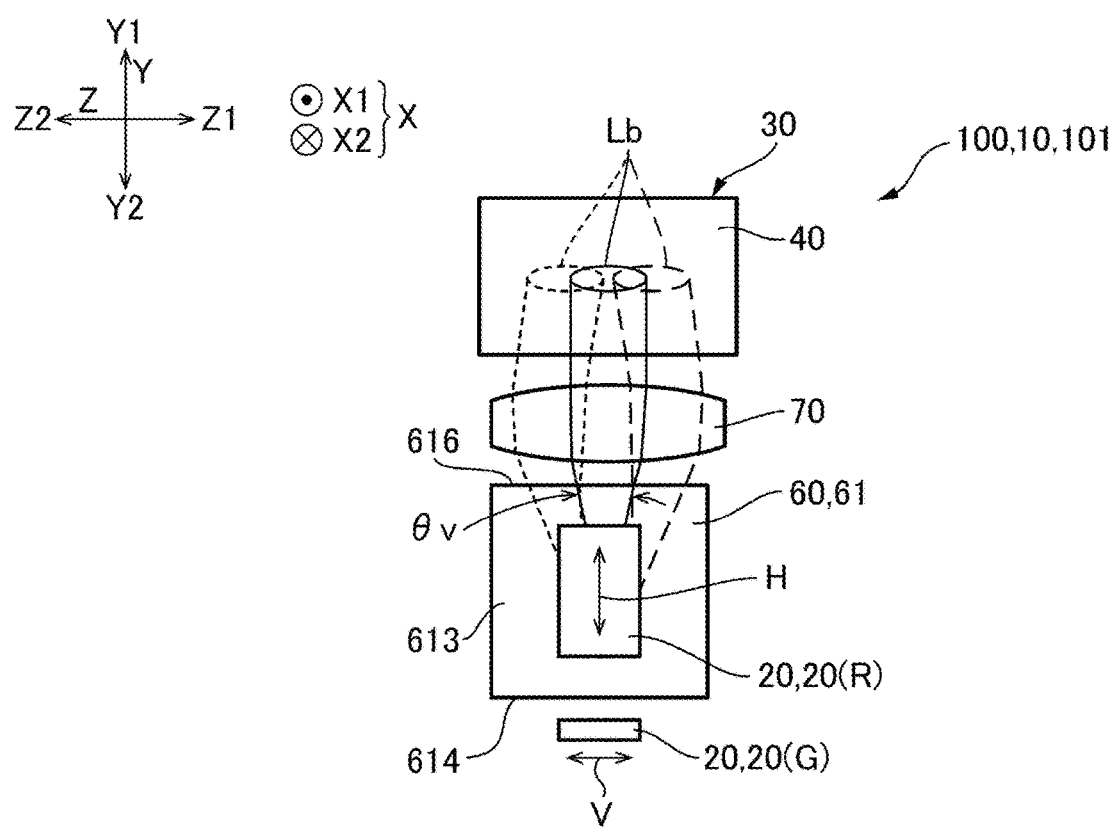
FIG. 4 is a side view of the display section shown in FIG. 2 as viewed from a first side in a first direction.
Figure 5:
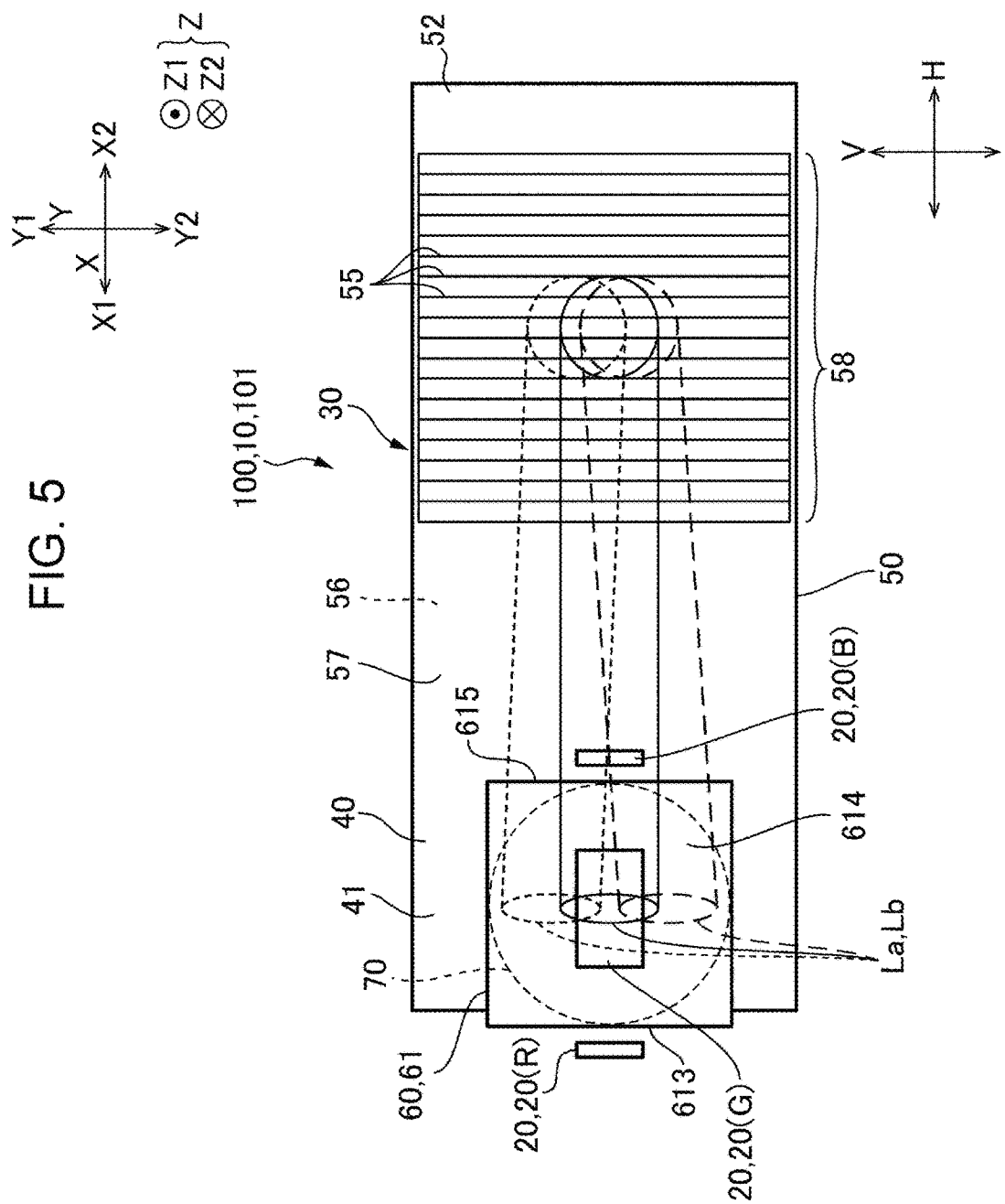
FIG. 5 is a front view of the display section shown in FIG. 2 as viewed from a first side in a second direction.

FIG. 2 is a schematic perspective view which illustrates a configuration of an optical system of the display section 10 shown in FIG. 1. FIG. 3 is a plan view of the display section 10 shown in FIG. 2 as viewed in the third direction Y. FIG. 4 is a side view of the display section 10 shown in FIG. 2 as viewed from the first side X1 in the first direction X. FIG. 5 is a front view of the display section 10 shown in FIG. 2 as viewed from the first side Z1 in the second direction Z. In FIGS. 2, 3, 4, and 5, portions corresponding to red, green, and blue light are indicated by (R), (G), and (B). Of a display light L from each display panel 20, only an effective luminous flux La that is incident on an eye E of an observer is illustrated as an image light L0. Further, in the illustration of effective luminous flux La, the effective luminous flux La emitted from the pixels at the center of the display panel 20 is indicated by the solid line, the effective luminous flux La emitted from the pixels on one end of the display panel 20 is indicated by the long dotted line, and the effective luminous flux La emitted from the pixels on the other end of the display panel 20 is indicated by the dotted line. Further, in FIGS. 2, 3, 4, and 5, the arrow which indicates the direction corresponding a horizontal direction H of the image and the arrow which indicates the direction corresponding a vertical direction V of the image are also indicated for the display panel 20.

As shown in FIG. 2, the display section 10 (display section 101) of the display apparatus 100 includes a plurality of display panels 20, a synthesis optical system 60 that synthesizes display light emitted from the plurality of display panels 20, and a light guiding system 30 that guides a synthesized light Lb emitted from the synthesis optical system 60 to a light-emitting section 58. A projection lens system 70 is disposed between the synthesis optical system 60 and the light guiding system 30 so that the synthesized light Lb emitted from the synthesis optical system 60 is incident on the light guiding system 30 via the projection lens system 70. The projection lens system 70 is composed of one collimating lens having positive power.

The light guiding system 30 includes a light-incident section 40 which is light-transmissive and allows the synthesized light Lb to be incident, and a light guiding section 50 which is light-transmissive and has a first end 51 located on the first side in the first direction X which is connected to the light-incident section 40. In the present embodiment, the light-incident section 40 and the light guiding section 50 are integrally formed as a light-transmissive member.

The light-incident section 40 includes a light-incident surface 41 on which the synthesized light Lb emitted from the synthesis optical system 60 is incident, and a reflection surface 42 that allows the synthesized light Lb incident from the light-incident surface 41 to be reflected between the reflection surface 42 and the light-incident surface 41. The light-incident surface 41 is formed of a flat surface, a non-spherical surface, a free curved surface, or the like oriented to the first side Z1 in the second direction Z, and faces the synthesis optical system 60 via the projection lens system 70. The projection lens system 70 is obliquely positioned such that a distance to an end 412 of the light-incident surface 41 which is located on the second side X2 in the first direction X is larger than a distance to an end 411 of the light-incident surface 41 which is located on the first side X1 in the first direction X. Although the light-incident surface 41 does not have a reflection film or the like, it totally reflects the light which is incident at an incident angle larger than a critical angle. Accordingly, the light-incident surface 41 has transmittance and reflectance. The reflection surface 42 is formed of a surface located on the second side Z2 in the second direction Z with respect to the light-incident surface 41, and is obliquely positioned such that the end 422 located on the second side X2 in the first direction X is further from the light-incident surface 41 than the end 421 located on the first side X1 in the first direction X is. Accordingly, as viewed in the third direction Y, the light-incident section 40 has a substantially triangular shape. The reflection surface 42 is formed of a flat surface, a non-spherical surface, a free curved surface, or the like. The reflection surface 42 can be formed having a reflective metal layer containing aluminum, silver, magnesium, chromium, or the like as a main component.

The light guiding section 50 includes a first surface 56 (first reflection surface) which extends from the first end 51 (an end on the first side X1) to the second end (an end on the second side X2) in the first direction X, and a second surface 57 (second reflection surface) which faces parallel with the first surface 56 on the first side Z1 in the second direction Z with respect to the first surface 56 and extends from the first end 51 to the second end 52 in the first direction X, and the light-emitting section 58 provided on the second surface 57 at a position spaced from the light-incident section 40. The first surface 56 is connected to the reflection surface 42 of the light-incident section 40 via an inclined surface 43. The thickness of the first surface 56 and the second surface 57 in the second direction Z (dimension of the light guiding section 50 in the second direction Z) is smaller than the dimension of the light-incident section 40 in the second direction Z. The first surface 56 and the second surface 57 totally reflect the light which is incident at an incident angle larger than a critical angle on the basis of a refractive index difference between the light guiding section 50 and the outside (air). Therefore, the first surface 56 and the second surface 57 do not include a refractive film or the like.

The light-emitting section 58 is provided on part of the light guiding section 50 close to the second surface 57 in the thickness direction. In the light-emitting section 58, a plurality of partial reflection surfaces 55, which are inclined toward the first side X1 in the first direction X from the normal line to the second surface 57 as viewed in the third direction Y, are arranged parallel with each other in the first direction X. The light-emitting section 58 is a portion of the second surface 57, which overlaps the plurality of partial reflection surfaces 55 in the first direction X, and a region having a predetermined width in the first direction X. The plurality of partial reflection surfaces 55 are each formed of a dielectric multilayer. Further, at least one of the plurality of partial reflection surfaces 55 may be a composite layer of a dielectric multilayer and a reflective metal layer (thin film) containing aluminum, silver, magnesium, chromium or the like as a main component. When the partial reflection surface 55 is formed including a metal layer, the effect of improving the reflectance of the partial reflection surface 55 and the effect of adjusting the incident angle dependence and polarization dependence of transmissivity and reflectivity of the partial reflection surface 55 can be achieved. Further, the light-emitting section 58 may also include an optical element such as diffraction grating, hologram, or the like.

Configuration of Display Panel 20 and Synthesis Optical System 60

Figure 6:
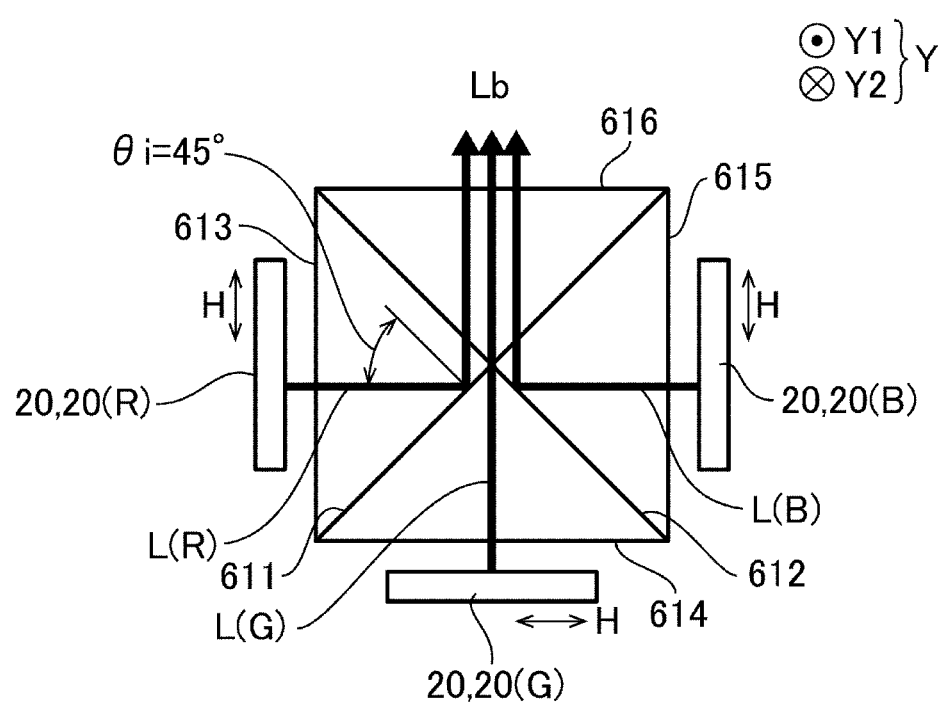
FIG. 6 is an explanatory view of a dichroic prism shown in FIG. 2 and the like as viewed in the third direction.

FIG. 6 is an explanatory view of a dichroic prism 61 shown in FIG. 2 and the like as viewed in the third direction Y. FIG. 7 is an explanatory view which schematically shows optical properties of the dichroic prism 61 shown in FIG. 2 and the like. The upper part of FIG. 7 shows a chart of the transmittance-wavelength characteristics of the first dichroic mirror 611, and the lower part of FIG. 7 shows a chart of the transmittance-wavelength characteristics of the second dichroic mirror 612.

In the present embodiment, the plurality of display panels 20 are organic electroluminescence display panels, in which organic electroluminescence elements are provided as light emitting elements for the respective plurality of pixels. In the present embodiment, the plurality of display panels 20 include a first display panel 20 (R) that emits red light and a second display panel 20 (G) that emits light (green light) in the wavelength range different from that of the first display panel 20 (R). Accordingly, the synthesis optical system 60 includes a first dichroic mirror 611 that passes one of a first display light L (R) from the first display panel 20 (R) and a second display light L (G) from the second display panel 20 (G) and reflects the other to thereby synthesize the first display light L (R) and the second display light L (G). The first dichroic mirror 611 is positioned obliquely to the light-emitting surface of the first display panel 20 (R) and the light-emitting surface of the second display panel 20 (G) as viewed in the third direction Y.

In the display apparatus 100, the display panels 20 further include a third display panel 20 (B) that emits light (blue light) in the wavelength range different from that of the first display panel 20 (R) and the second display panel 20 (G). Accordingly, the synthesis optical system 60 includes a second dichroic mirror 612 that passes one of the second display light L (G) and the third display light L (B) from the third display panel 20 (B) and reflects the other to thereby synthesize the second display light L (G) and the third display light L (B). The second dichroic mirror 612 is positioned obliquely to the light-emitting surface of the second display panel 20 (G) and the light-emitting surface of the third display panel 20 (B) as viewed in the third direction Y. The wavelength range of the first display light L (R) is from 620 to 750 nm, the wavelength range of the second display light L (G) is from 495 to 570 nm, and the wavelength range of the third display light L (B) is from 450 to 495 nm. Further, the first display light L (R), the second display light L (G), and the third display light L (B) are nonpolarized light with a large radiation angle.

As shown in FIG. 6, in the present embodiment, the synthesis optical system 60 is a dichroic prism 61 in which the first dichroic mirror 611 and the second dichroic mirror 612 obliquely intersect with each other as viewed in the third direction Y. The dichroic prism 61 includes a first light-incident surface 613 formed parallel with the light-emitting surface of the first display panel 20 (R) and allows the first display light L (R) to be incident, a second light-incident surface 614 formed parallel with the light-emitting surface of the second display panel 20 (G) and allows the second display light L (G) to be incident, and a third light-incident surface 615 formed parallel with the light-emitting surface of the third display panel 20 (B) and allows the third display light L (B) to be incident. The first light-incident surface 613 and the third light-incident surface 615 face in the first direction X. The dichroic prism 61 includes a second light-incident surface 614 and a light-emitting surface 616, which is parallel with the second light-incident surface 614, between the first light-incident surface 613 and the third light-incident surface 615.

In the present embodiment, the dichroic prism 61 is a square shape as viewed in the third direction Y, and the first dichroic mirror 611 and the second dichroic mirror 612 are disposed on two diagonal lines of the square. Accordingly, as viewed in the third direction Y, angles formed between each of the first dichroic mirror 611 and the second dichroic mirror 612 and each of the light-emitting surface of the first display panel 20 (R), the light-emitting surface of the second display panel 20 (G), and the light-emitting surface of the third display panel 20 (B) are 45°. Incident angles of the center optical axis of the first display light L (R), the center optical axis of the second display light L (G), and the center optical axis of the third display light L (B) to the first dichroic mirror 611, and incident angles to the second dichroic mirror 612 are 45°.

In the dichroic prism 61 having the above configuration, transmittance-wavelength characteristics of the first dichroic mirror 611 and the second dichroic mirror 612 are shown in FIG. 7. Accordingly, as shown in FIG. 6, the first dichroic mirror 611 reflects the first display light L (R) and passes the second display light L (G) and the third display light L (B). The second dichroic mirror 612 reflects the third display light L (B) and passes the first display light L (R) and the second display light L (G). Accordingly, the synthesis optical system 60 (dichroic prism 61) synthesizes the first display light L (R), the second display light L (G) and the third display light L (B) and emits the synthesized light. The transmissivity and reflectivity of the first dichroic mirror 611 and the second dichroic mirror 612 have incident angle dependence. For example, in FIG. 7, the transmittance-wavelength characteristics when the incident angle θi is 45° is indicated by the solid line. The transmittance-wavelength characteristics when the incident angle θi is 48° is shifted as indicated by the long dashed short dashed line. Therefore, the dielectric multilayer which constitutes the first dichroic mirror 611 and the second dichroic mirror 612 is designed in a film configuration or the like on the assumption that the incident angle θi of 45°.

Basic Operation

In the display apparatus 100, when the first display panel 20 (R), the second display panel 20 (G), and the third display panel 20 (B) are actuated, the first display panel 20 (R), the second display panel 20 (G), and the third display panel 20 (B) emit the first display light L (R), the second display light L (G), and the third display light L (B), respectively, to the synthesis optical system 60. The first display light L (R), the second display light L (G), and the third display light L (B) are synthesized by the synthesis optical system 60, and the synthesized light Lb emitted from the synthesis optical system 60 is incident on the light-incident section 40 of the light guiding system 30 via the projection lens system 70.

The synthesized light Lb composed of parallel light which is incident from the light-incident section 40 refracts at the light-incident surface 41 and is directed to the reflection surface 42. Then, the synthesized light Lb is reflected by the reflection surface 42 and is directed back to the light-incident surface 41. In so doing, since the synthesized light Lb is incident on the light-incident surface 41 at an incident angle larger than a critical angle, the synthesized light Lb is reflected by the light-incident surface 41 toward the light guiding section 50 and is directed to the light guiding section 50. Although the light-incident section 40 is configured such that the synthesized light Lb which is parallel light is incident on the light-incident surface 41, the light-incident surface 41 and the reflection surface 42 may be formed as a free curved surface so that the synthesized light Lb which is not parallel light is converted into parallel right to be reflected between the reflection surface 42 and the light-incident surface 41 after it is incident on the light-incident surface 41.

In the light guiding section 50, the synthesized light Lb is reflected between the first surface 56 and the second surface 57 and is directed from the first side X1 to the second side X2 in the first direction X. Then, part of the synthesized light Lb incident on the partial reflection surface 55 is reflected by the partial reflection surface 55 and is emitted from the light-emitting section 58 toward the eye E of an observer. Further, the remaining of the synthesized light Lb incident on the partial reflection surface 55 passes through the partial reflection surface 55 and is incident on the next partial reflection surface 55 which is adjacent on the second side X2 in the first direction X. Thus, at each of the plurality of partial reflection surfaces 55, the synthesized light Lb reflected on the first side Z1 in the second direction Z is emitted from the light-emitting section 58 toward the eye E of an observer. Accordingly, an observer can recognize a virtual image. Meanwhile, the light incident on the light guiding section 50 from outside, after being incident on the light guiding section 50, passes through the partial reflection surface 55 and reaches the eye E of an observer. Accordingly, an observer can see a color image obtained by synthesizing the first display light L (R), the second display light L (G), and the third display light L (8) emitted from the first display panel (R), the second display panel (G), and the third display panel (B) at the same time as seeing an outside image by see-through.

According to the display apparatus 100 having the above configuration, in an image recognized by an observer, a direction extending in the first direction X is the horizontal direction H, and a direction extending in the third direction Y is the vertical direction V.

Main Effects of the Present Embodiment

Figure 8:
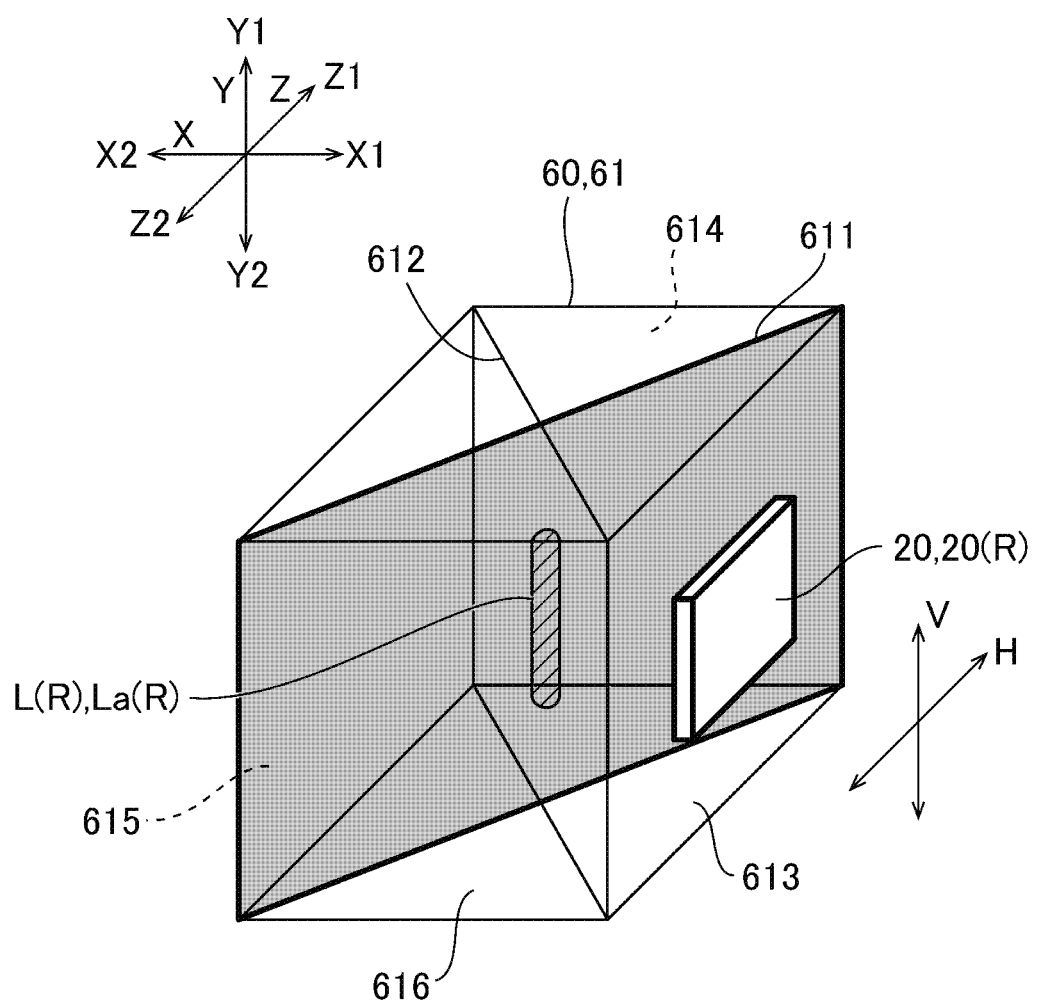
FIG. 8 is an explanatory view which illustrates that a first display light is incident on a first dichroic mirror in the display apparatus shown in FIG. 2.

FIG. 8 is an explanatory view which illustrates that the first display light L (R) is incident on the first dichroic mirror 611 in the display apparatus 100 shown in FIG. 2.

As described above, in the display section 101 of the display apparatus 100 in the present embodiment, the display light L emitted from the respective pixels of the display panels 20 is incident on the light guiding section 50 via the light-incident section 40 after the lights corresponding to each color are synthesized by the dichroic prism 61 into the synthesized light Lb. Then, the synthesized light Lb is directed in the light guiding section 50 from the first end 51 to the second end 52 in the first direction X while being reflected between the first surface 56 and the second surface 57 which face in the second direction Z and emitted from the light-emitting section 58 toward the first side Z1 in the second direction Z. Accordingly, an observer can recognize an image of the horizontal direction H extending in the first direction X and the vertical direction V extending in the third direction Y.

In the display light L emitted from the respective pixels of the display panel 20, although the radiation angle in the direction corresponding to the horizontal direction H of the image is equal to the radiation angle in the direction corresponding to the vertical direction V of the image, the display light L is limited in the direction corresponding to the horizontal direction H of the image by the thickness or the like of the light guiding section 50 in the second direction Z, which causes only a small range of a radiation angle θh of the light to reach the eye E of an observer. On the other hand, the display light L is not limited in the direction corresponding to the third direction Y (the vertical direction V of the image) by the thickness or the like of the light guiding section 50 in the second direction Z, which causes a wide range of a radiation angle θv of the light to reach the eye E of an observer. As a result, in the display light L, an effective luminous flux La is incident on the eye E of an observer as an image light L0, and in the effective luminous flux La, the radiation angle θv corresponding to the vertical direction V of the image is larger than the radiation angle θh corresponding to the horizontal direction H of the image.

However, in the display light L, the width of the luminous flux in the direction corresponding to the horizontal direction H of the image is increased in luminous flux diameter in the horizontal direction H of the image while the light is directed in the light guiding section 50 and is emitted from the light-emitting section 58 by being emitted via the plurality of partial reflection surfaces 55. As a result, as shown in FIG. 5, the display light L from one of the pixels of the display panel 20 is emitted having the same diameter in the horizontal direction H and the vertical direction V.

For such a configuration, in the present embodiment, the first dichroic mirror 611 and the second dichroic mirror 612 are positioned to intersect with each other as viewed in the third direction Y. As a consequence, in the display light L emitted from the respective pixels of the display panel 20, the effective luminous flux La which reaches the eye E of an observer has a small range of incident angle to the first dichroic mirror 611 and the second dichroic mirror 612 in the direction corresponding to the vertical direction V (direction in which the radiation angle effectively used (effective radiation angle) is large). For example, in the display apparatus 100 according to the present embodiment as shown in FIG. 8, in the first display light L (R) emitted from the respective pixels of the first display panel 20 (R), the effective luminous flux La (R) which reaches the eye E of an observer has a small range of incident angle to the first dichroic mirror 611 in the direction corresponding to the vertical direction V (direction in which the radiation angle effectively used (effective radiation angle) is large), and the range of incident angle is small in deviation from 45°. Accordingly, the direction in which the radiation angle is used in a wide range (direction corresponding to the vertical direction V of the image) is effected by incident angle dependence to a small degree, and thus the light utilization efficiency is high.

In particular, the display panel 20, which is configured such that each of a plurality of pixels has an organic electroluminescence element, emits nonpolarized light. As a consequence, since the polarization dependence of the first dichroic mirror 611 and the second dichroic mirror 612 are required to be taken into account, it is difficult to decrease the incident angle dependence of the first dichroic mirror 611 and the second dichroic mirror 612. However, according to the present embodiment, the degree effected by the incident angle dependence is small, which ensures high light utilization efficiency.

Embodiment 2

Figure 9:
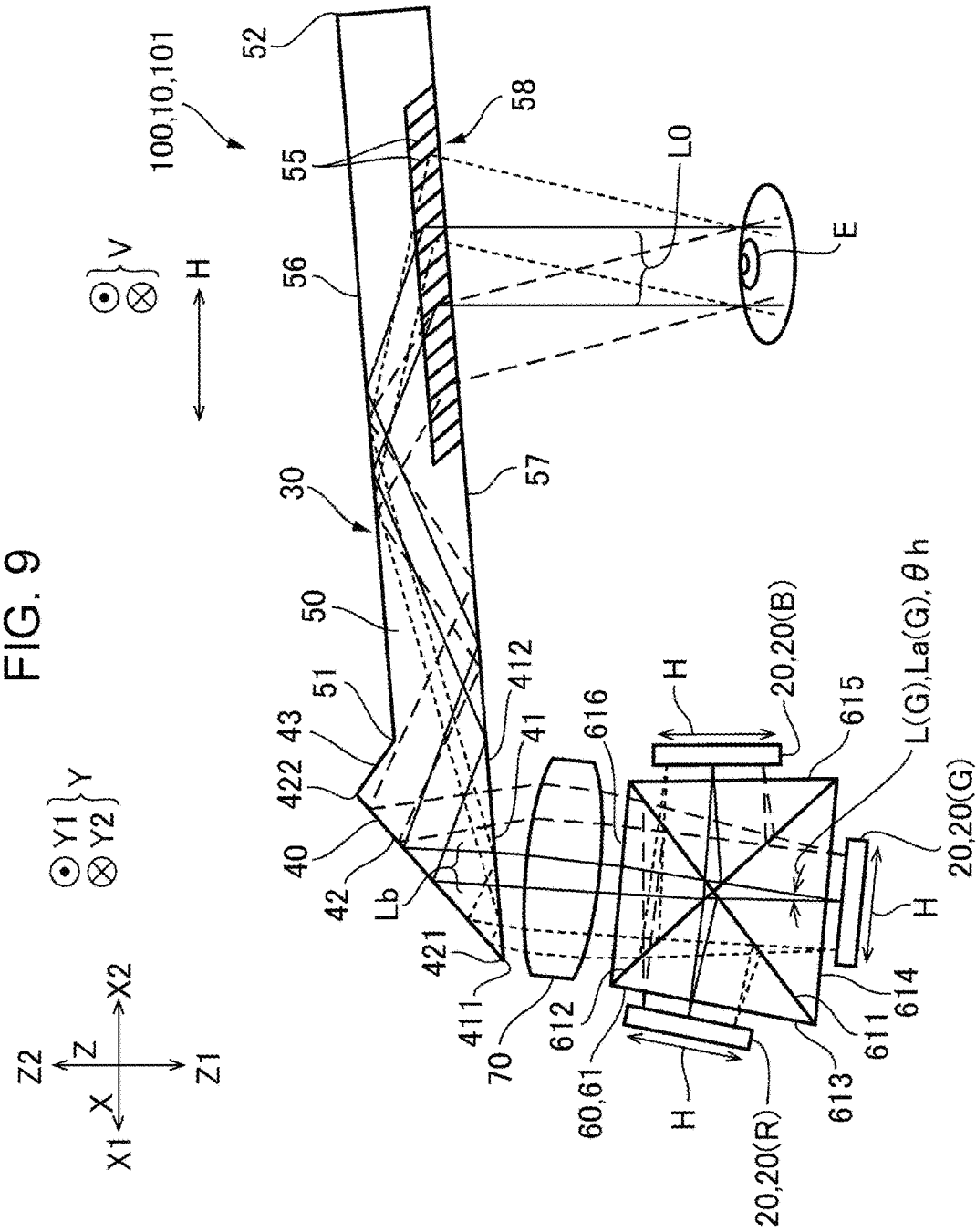
FIG. 9 is a plan view of a display apparatus according to Embodiment 2 of the present invention as viewed in the third direction.
Figure 10:
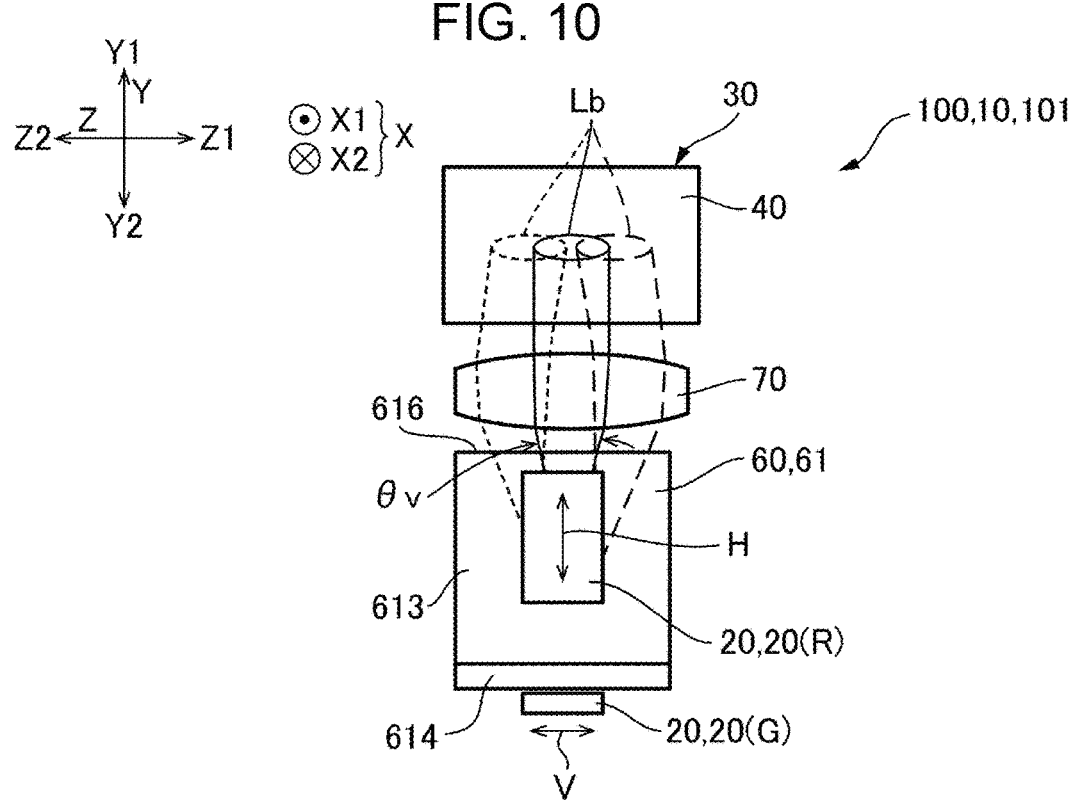
FIG. 10 is a side view of the display apparatus shown in FIG. 9 as viewed in a first direction.
Figure 11:
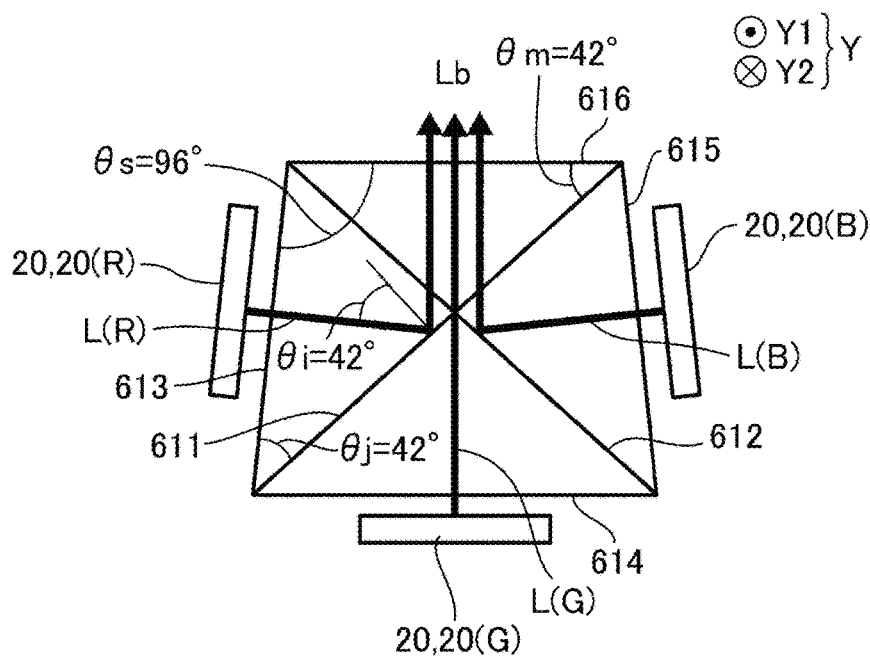
FIG. 11 is an explanatory view of the dichroic prism shown in FIG. 2 and the like as viewed in the third direction.

FIG. 9 is a plan view of a display apparatus 100 according to Embodiment 2 of the present invention as viewed in the third direction Y. FIG. 10 is a side view of the display apparatus 100 shown in FIG. 9 as viewed in the first direction X. FIG. 11 is an explanatory view of a dichroic prism 61 shown in FIG. 2 and the like as viewed in the third direction Y. Since the present embodiment has the same basic configuration as that of Embodiment 1, the same elements are referred to by the same reference numerals and the description thereof is omitted.

As shown in FIGS. 9 and 10, as with Embodiment 1, the display apparatus 100 of the present embodiment includes a plurality of display panels 20 (a first display panel 20 (R), a second display panel 20 (G), and a third display panel 20 (B)), a synthesis optical system 60 that synthesizes display light emitted from the plurality of display panels 20, and a light guiding system 30 that guides a synthesized light emitted from the synthesis optical system 60 to a light-emitting section 58. A projection lens system 70 is disposed between the synthesis optical system 60 and the light guiding system 30 so that the synthesized light Lb emitted from the synthesis optical system 60 is incident on the light guiding system 30 via the projection lens system 70.

The synthesis optical system 60 is a dichroic prism 61 in which the first dichroic mirror 611 and the second dichroic mirror 612 obliquely intersect with each other as viewed in the third direction Y. The dichroic prism 61 includes a first light-incident surface 613 formed parallel with the light-emitting surface of the first display panel 20 (R) and allows the first display light L (R) to be incident, a second light-incident surface 614 formed parallel with the light-emitting surface of the second display panel 20 (G) and allows the second display light L (G) to be incident, a third light-incident surface 615 formed parallel with the light-emitting surface of the third display panel 20 (B) and allows the third display light L (B) to be incident, and a light-emitting surface 616 formed parallel with the second light-incident surface 614. The dichroic prism 61 is a rectangular shape as viewed in the third direction Y, and the first dichroic mirror 611 and the second dichroic mirror 612 are disposed on two diagonal lines of the rectangular shape.

A dimension of the light-emitting surface 616 in the first direction X is smaller than that of the second light-incident surface 614. Accordingly, as viewed in the third direction Y, the dichroic prism 61 has a trapezoid shape with the first light-incident surface 613 and the third light-incident surface 615 are inclined to the second light-incident surface 614 and the light-emitting surface 616. Accordingly, as viewed in the third direction Y, an angle formed between the first dichroic mirror 611 and the light-emitting surface of the first display panel 20 (R), and an angle formed between the second dichroic mirror 612 and the light-emitting surface of the second display panel 20 (B) is less than 45°. Further, the first light-incident surface 613 and the third light-incident surface 615 are symmetrically arranged about the perpendicular bisector of the second light-incident surface 614 (perpendicular bisector of the light-emitting surface 616).

In the present embodiment, as shown in FIG. 11, an angle $\theta s$ formed between the light-emitting surface 616 and the first light-incident surface 613 is 96°, an angle $\theta m$ formed between the light-emitting surface 616 and the first dichroic mirror 611 is 42°, and an angle $\theta j$ formed between the first light-incident surface 613 and the first dichroic mirror 611 (angle formed between the light-emitting surface of the first display panel 20 (R) and the first dichroic mirror 611) is 42°. Accordingly, an incident angle $\theta i$ of the center optical axis of the first display light L (R) from the first display panel 20 (R) to the first dichroic mirror 611 is 42°. Similarly, an angle formed between the light-emitting surface 616 and the third light-incident surface 615 is 96°, an angle formed between the light-emitting surface 616 and the second dichroic mirror 612 is 42°, and an angle formed between the third light-incident surface 615 and the second dichroic mirror 612 (angle formed between the light-emitting surface of the third display panel 20 (B) and the second dichroic mirror 612) is 42°. Accordingly, an incident angle of the center optical axis of the third display light L (B) from the third display panel 20 (B) to the second dichroic mirror 612 is 42°. Further, an incident angle of the center optical axis of the second display light L (G) from the second display panel 20 (G) to the first dichroic mirror 611 and the second dichroic mirror 612 is 42°.

In the display apparatus 100 having the above configuration, as with Embodiment 1, the first dichroic mirror 611 and the second dichroic mirror 612 are positioned to intersect with each other as viewed in the third direction Y. As a consequence, in the display light L emitted from the respective pixels of the display panel 20, the effective luminous flux La which reaches the eye E of an observer has a small range of incident angle to the first dichroic mirror 611 and the second dichroic mirror 612 in the direction corresponding to the vertical direction V (direction in which the radiation angle used is large). Accordingly, the degree effected by the incident angle dependence is small in the direction in which the radiation angle is effectively used in a wide range (direction corresponding to the vertical direction V of the image), and thus the light utilization efficiency is high.

Further, as viewed in the third direction Y, an incident angle $\theta i$ of the center optical axis of the first display light L (R) from the first display panel 20 (R) to the first dichroic mirror 611 is less than 45°, and an incident angle of the center optical axis of the third display light L (B) from the third display panel 20 (B) to the second dichroic mirror 612 is 42°. Further, an incident angle of the center optical axis of the second display light L (G) from the second display panel 20 (G) to the first dichroic mirror 611 and the second dichroic mirror 612 is 42°. Accordingly, an incident angle can be small in the direction in which the radiation angle is used in a small range (direction corresponding to the horizontal direction H of the image), and the thus the degree effected by the incident angle dependence is small. Therefore, the light utilization efficiency is high. In the present embodiment, as viewed in the third direction Y, an angle formed between the first dichroic mirror 611 and the light-emitting surface of the first display panel 20 (R) and an angle formed between the second dichroic mirror 612 and the light-emitting surface of the third display panel 20 (B) are 42°. However, if these angles are too small, the second light-incident surface 614 which corresponds to a lower side of the trapezoid of the dichroic prism 61 is too longer relative to the light-emitting surface 616 which corresponds to an upper side, leading to a problem that the plurality of display panels 20 (the first display panel 20 (R), the second display panel 20 (G), and the third display panel 20 (B)) and the synthesis optical system 60 including the dichroic prism 61 increases in size. Accordingly, as viewed in the third direction Y, an angle formed between the first dichroic mirror 611 and the light-emitting surface of the first display panel 20 (R), and an angle formed between the second dichroic mirror 612 and the light-emitting surface of the third display panel 20 (B) is preferably 40° or more and less than 45°.

Modification of Embodiment 2

In the above embodiment, both the first light-incident surface 613 and the third light-incident surface 615 were formed inclined to the second light-incident surface 614 and the light-emitting surface 616. However, another configuration is possible in which one of the first light-incident surface 613 and the third light-incident surface 615 is inclined to the second light-incident surface 614 and the light-emitting surface 616.

Embodiment 3

Figure 12:
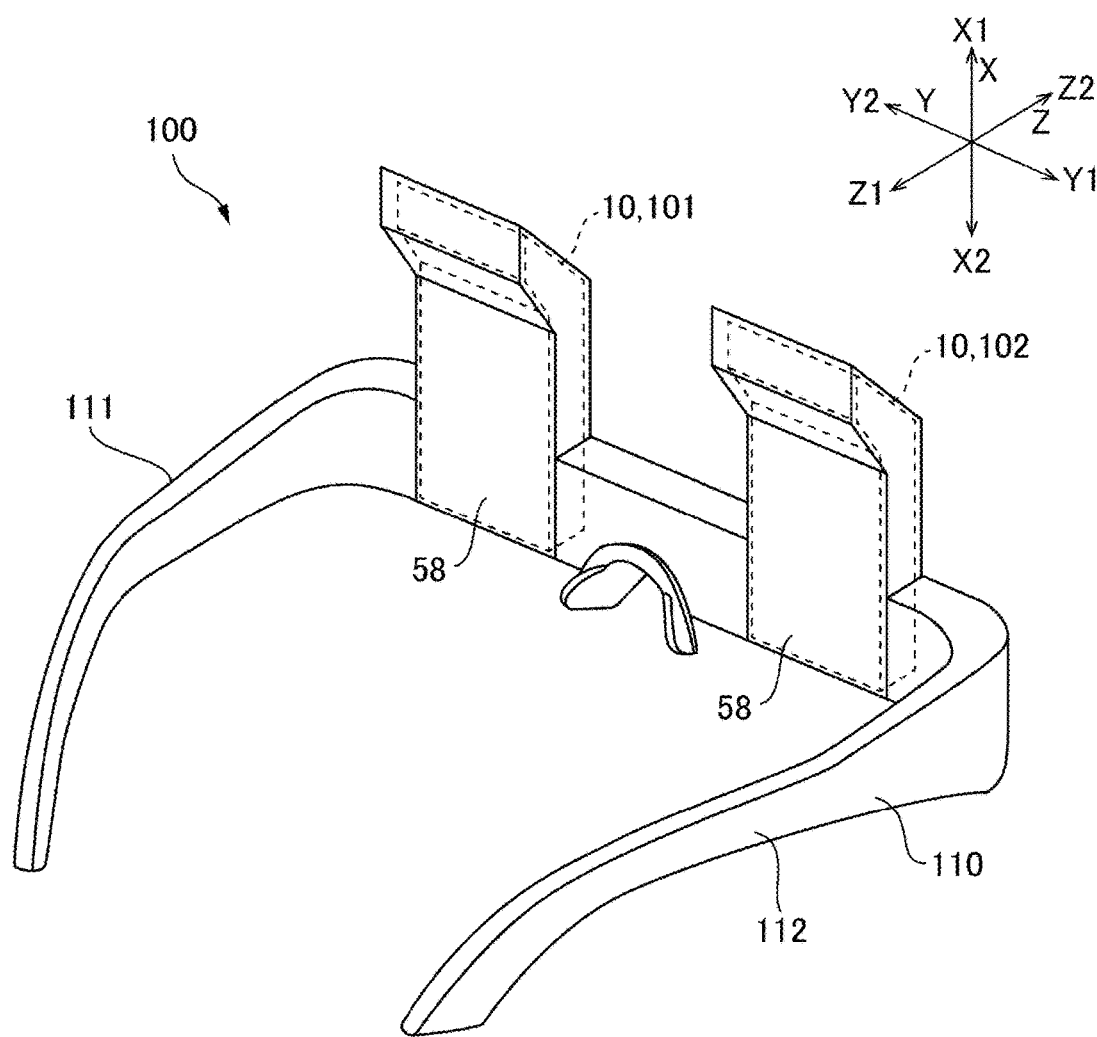
FIG. 12 is a schematic explanatory view of an example of an outer appearance of a display apparatus according to Embodiment 3 of the present invention.
Figure 13:
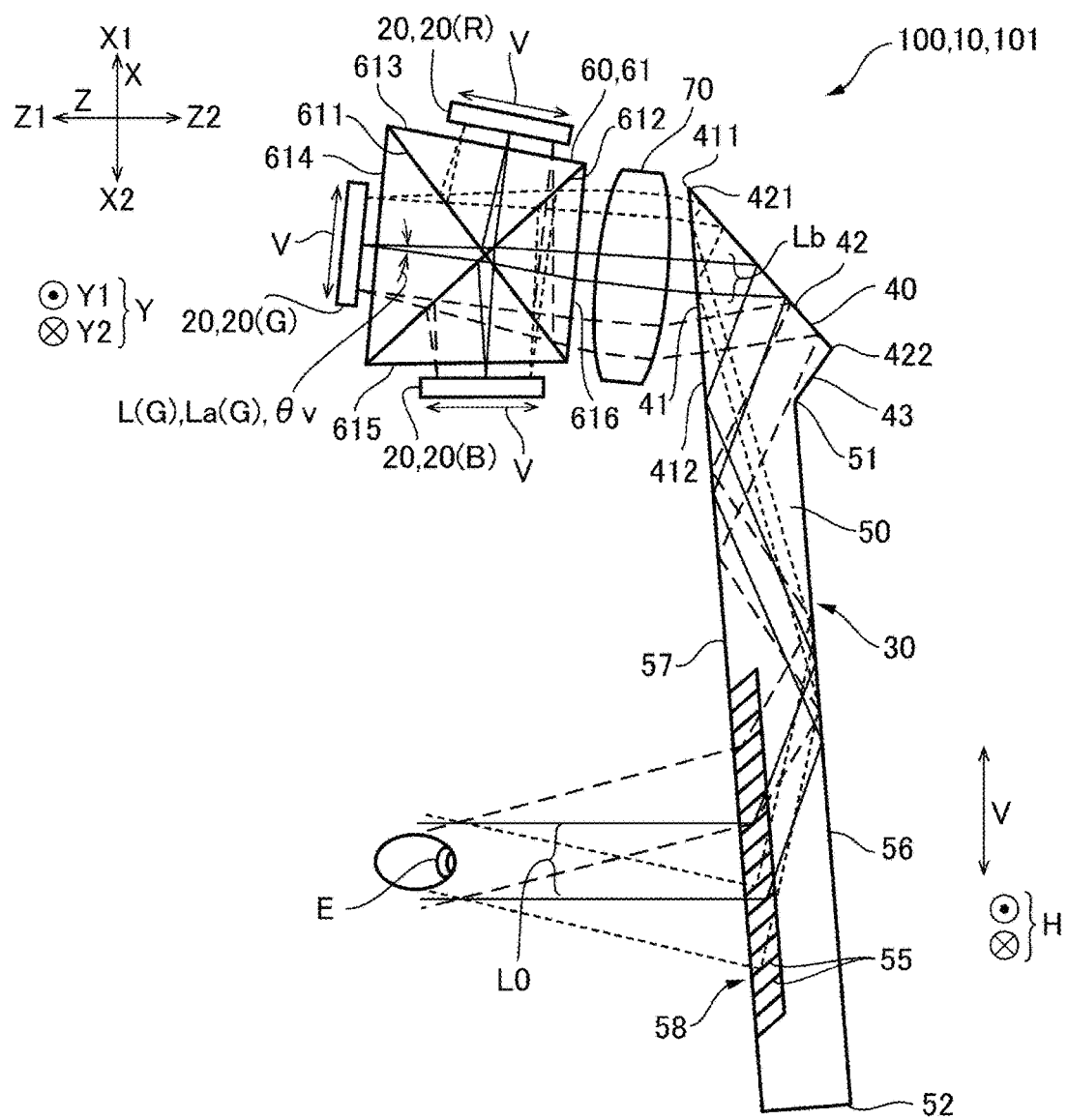
FIG. 13 is a side view of the display apparatus shown in FIG. 12 as viewed from the right side.
Figure 14:
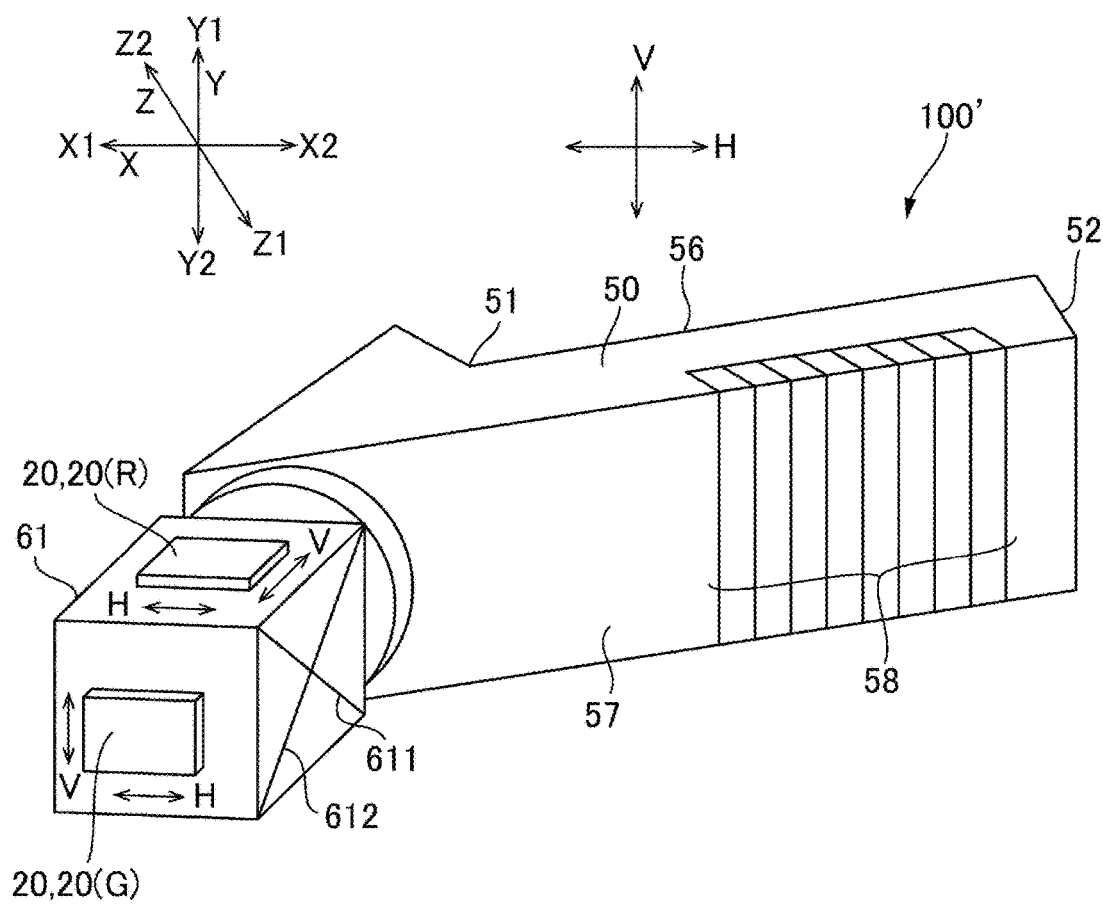
FIG. 14 is a schematic perspective view which illustrates a configuration of an optical system of a display section according to a reference example of the present invention.
Figure 15:
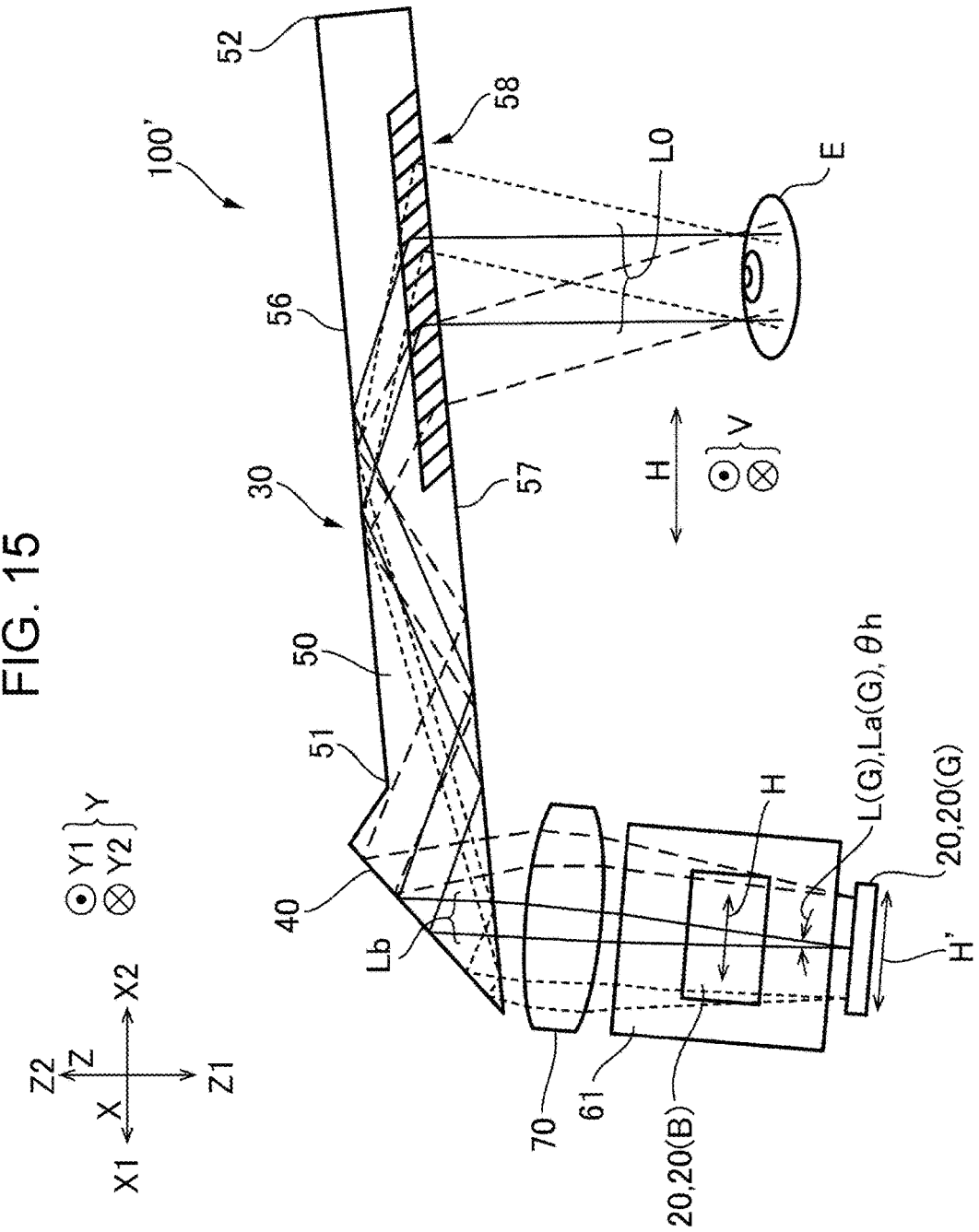
FIG. 15 is a plan view of the display section shown in FIG. 14 as viewed in the third direction.
Figure 16:
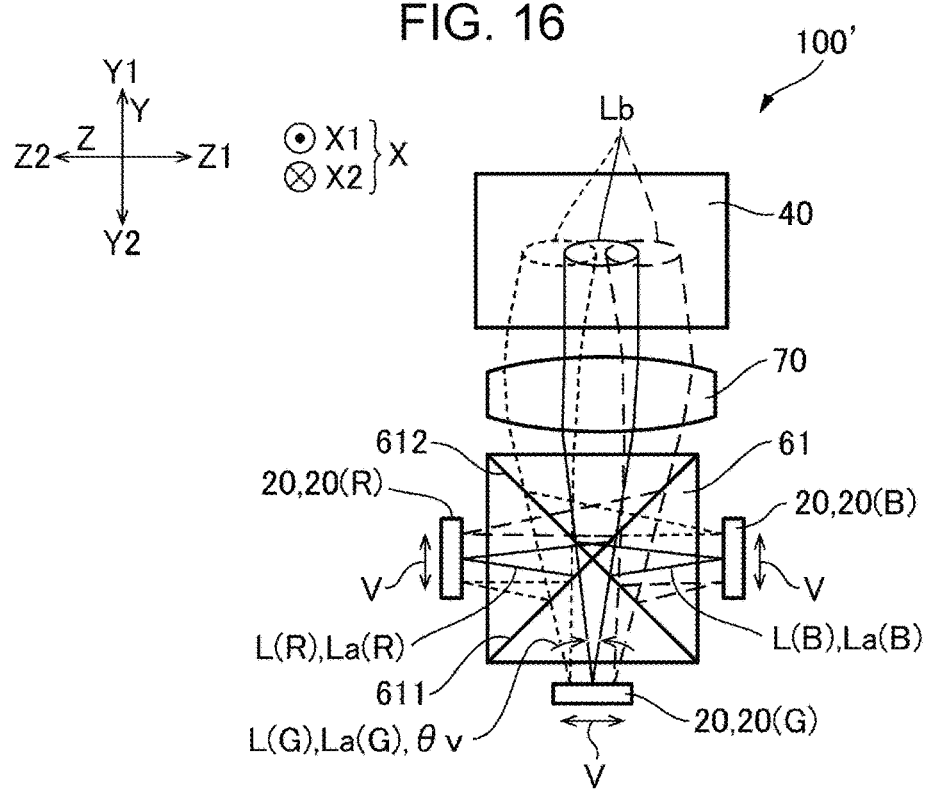
FIG. 16 is a side view of the display section shown in FIG. 14 as viewed from the first side in the first direction.
Figure 17:
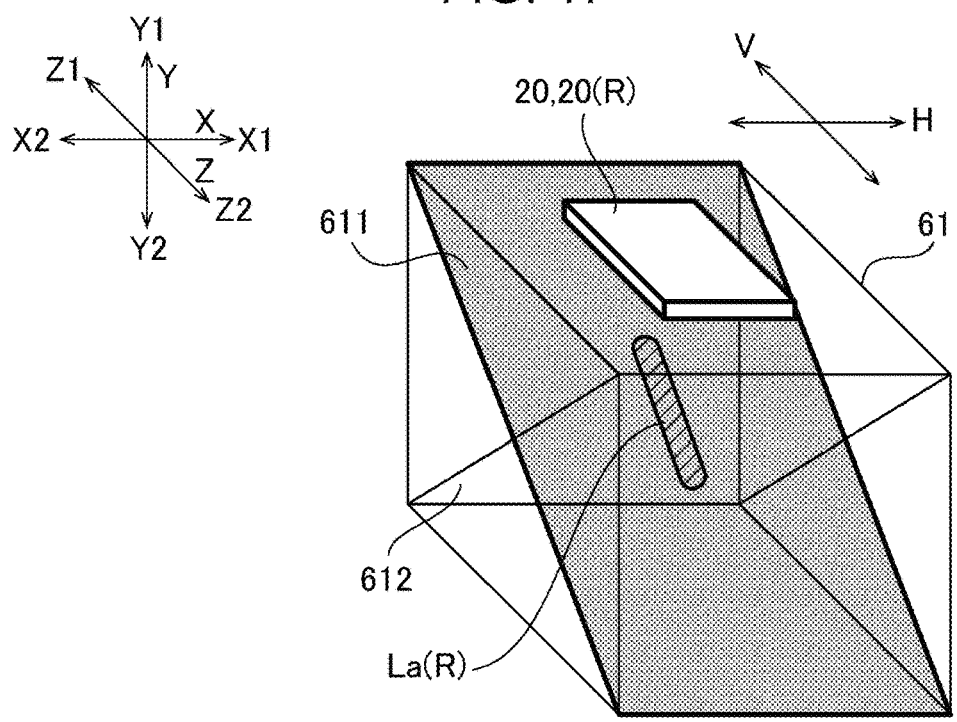
FIG. 17 is an explanatory view of the dichroic prism shown in FIG. 2 and the like as viewed in the first direction.

FIG. 12 is a schematic explanatory view of an example of an outer appearance of a display apparatus 100 according to Embodiment 3 of the present invention. FIG. 13 is a side view of the display apparatus 100 shown in FIG. 12 as viewed from the right side. In the display apparatus 100 according to Embodiment 1, the display panels 20 and the synthesis optical system 60 (dichroic prism 61) are positioned adjacent to the ear of an observer and the synthesized light Lb is guided from the ear to the nose. On the other hand, in the present embodiment, as shown in FIGS. 12 and 13, display panels 20 (a first display panel 20 (R), a second display panel 20 (G), and a third display panel 20 (B)), a synthesis optical system 60 (dichroic prism 61), and a projection lens system 70 are positioned on the upper side before the eye, and a light guiding section 50 extends from an upper side to lower side. Accordingly, a synthesized light Lb is guided from upper side to lower side and is emitted toward an eye E. Thus, in the present embodiment, the up-down direction corresponds to the first direction X, the front-back direction corresponds to the second direction Z, and the left-right direction corresponds to the third direction Y. Further, the first side X1 in the first direction X (the first end 51 of the light guiding section 50) corresponds to the upper side, and the second side X2 in the first direction X (the second end 52 of the light guiding section 50) corresponds to the lower side. Further, the vertical direction V of the image corresponds to the first direction X, and the horizontal direction H of the image corresponds to the third direction Y.

In the display section 101 of the display apparatus 100 having the above configuration, the display light L emitted from the respective pixels of the display panels 20 is incident on the light guiding section 50 via the light-incident section 40 after the lights corresponding to each color are synthesized by the dichroic prism 61 into the synthesized light Lb. Then, the synthesized light Lb is directed in the light guiding section 50 from the first end 51 to the second end 52 in the first direction X while being reflected between the first surface 56 and the second surface 57 which face in the second direction Z and emitted from the light-emitting section 58 toward the first side Z1 in the second direction Z. Accordingly, an observer can recognize an image of the vertical direction V extending in the first direction X and the horizontal direction H extending in the third direction Y.

In the display light L emitted from the respective pixels of the display panel 20, although the radiation angle in the direction corresponding to the horizontal direction H of the image is equal to the radiation angle in the direction corresponding to the vertical direction V of the image, the display light L is limited in the direction corresponding to the vertical direction V of the image by the thickness or the like of the light guiding section 50 in the second direction Z, which causes only a small range of the radiation angle θv of the display light L to reach the eye E of an observer. On the other hand, the display light L is not limited in the direction corresponding to the third direction Y (the horizontal direction H of the image) by the thickness or the like of the light guiding section 50 in the second direction Z, which causes a wide range of the radiation angle θh of the light to reach the eye E of an observer. As a result, in the display light L, an effective luminous flux La is incident on the eye E of an observer as an image light L0, and in the effective luminous flux La, the radiation angle θh corresponding to the horizontal direction H of the image is larger than the radiation angle θv corresponding to the vertical direction V of the image. However, in the display light L, the luminous flux in the direction corresponding to the vertical direction V of the image is increased while the light is directed in the light guiding section 50 and is emitted from the light-emitting section 58. Accordingly, the display light L emitted from the respective pixels of the display panels 20 is emitted having the same diameter in the horizontal direction H and the vertical direction V when emitted from the light-emitting section 58.

For such a configuration, in the present embodiment, the first dichroic mirror 611 and the second dichroic mirror 612 are positioned to intersect with each other as viewed in the third direction Y. As a consequence, in the display light L emitted from the respective pixels of the display panel 20, the effective luminous flux La which reaches the eye E of an observer has a small range of incident angle to the first dichroic mirror 611 and the second dichroic mirror 612 in the direction corresponding to the horizontal direction H (direction in which the radiation angle used is large), and the range of incident angle is small in deviation from 45°. Accordingly, the degree effected by the incident angle dependence is small in the direction in which the radiation angle is used in a wide range (direction corresponding to the horizontal direction H of the image), and thus the same effects as Embodiment 1 such as high light utilization efficiency can be achieved.

Other Embodiments

Although the above embodiments are described as having three display panels 20, the present invention can be applied to a configuration having two display panels 20. In this case, one dichroic mirror is used as the synthesis optical system 60.

In the above embodiments, although the respective plurality of pixels of the display panels 20 are described as having organic electroluminescence elements, the respective plurality of pixels may also have digital mirror devices that modulate the light emitted from a light-emitting diode. In a case where the plurality of pixels of the display panels 20 have organic electroluminescence elements or digital mirror devices, unlike the case of liquid crystal panel, the display panels 20 emit nonpolarized light. Accordingly, since the polarization dependence of the first dichroic mirror 611 and the second dichroic mirror 612 are required to be taken into account, it is difficult to decrease the incident angle dependence of the first dichroic mirror 611 and the second dichroic mirror 612. Therefore, large effects can be achieved by applying the present invention.

The entire disclosure of Japanese Patent Application No. 2017-109012 filed Jun. 1, 2017 is expressly incorporated by reference herein.

What is claimed is:
1. A display apparatus comprising:
a first display panel having a plurality of pixels and configured to emit a nonpolarized first display light;
a second display panel having a plurality of pixels and configured to emit a nonpolarized second display light in a wavelength range different from that of the first display light;
a third display panel having a plurality of pixels and configured to emit a nonpolarized third display light in a wavelength range different from that of the first display light and the second display light;
a synthesis optical system which is a dichroic prism in which a first dichroic mirror and a second dichroic mirror are positioned to intersect with each other, the synthesis optical system including:
  the first dichroic mirror that reflects the first display light and passes the second display light and the third display light; and
  the second dichroic mirror that reflects the third display light and passes the first display light and the second display light;
a plate-shaped light guiding section which has:
  a first surface extending from a first end to a second end in a first direction; and
  a second surface facing the first surface on a first side in a second direction, which is perpendicular to the first direction, and extending from the first end to the second end in the first direction, wherein:
the plate-shaped light guiding section is configured to guide synthesized light emitted from the synthesis optical system to be directed from the first end to the second end in the first direction while reflecting the synthesized light between the first surface and the second surface, so that the synthesized light is emitted via a light-emitting section toward the first side in the second direction;
the first dichroic mirror is positioned obliquely to a light-emitting surface of the first display panel and a light-emitting surface of the second display panel as viewed in a third direction, which is perpendicular to the first direction and the second direction;
the second dichroic mirror is positioned obliquely to the light-emitting surface of the second display panel and a light-emitting surface of the third display panel as viewed in the third direction; and
at least one of (i) a first angle formed between the first dichroic mirror and the light-emitting surface of the first display panel as viewed in the third direction and (ii) a second angle formed between the second dichroic mirror and the light-emitting surface of the third display panel as viewed in the third direction is less than 45°.

2. The display apparatus according to claim 1, wherein in the synthesized light emitted from the light-emitting section, a luminous flux of light emitted from one pixel in the first display panel or the second display panel has an equal diameter in two directions perpendicular to each other.

3. The display apparatus according to claim 1, wherein each of the plurality of pixels has an organic electroluminescence element.

4. The display apparatus according to claim 1, wherein the first direction is a left-right direction, the second direction is a front-back direction, and the third direction is an up-down direction.

5. The display apparatus according to claim 1, wherein the first direction is an up-down direction, the second direction is a front-back direction, and the third direction is a left-right direction.

6. A display apparatus comprising:
a first display panel having a plurality of pixels and configured to emit a nonpolarized first display light;
a second display panel having a plurality of pixels and configured to emit a nonpolarized second display light in a wavelength range different from that of the first display light;
a third display panel having a plurality of pixels and configured to emit a nonpolarized third display light in a wavelength range different from that of the first display light and the second display light;
a synthesis optical system which is a dichroic prism in which a first dichroic mirror and a second dichroic mirror are positioned to intersect with each other, the synthesis optical system including:
  the first dichroic mirror that reflects the first display light and passes the second display light and the third display light; and
  the second dichroic mirror that reflects the third display light and passes the first display light and the second display light;
a plate-shaped light guiding section which has:
  a first surface extending from a first end to a second end in a first direction; and
  a second surface facing the first surface on a first side in a second direction, which is perpendicular to the first direction, and extending from the first end to the second end in the first direction, wherein:
the plate-shaped light guiding section is configured to guide synthesized light emitted from the synthesis optical system to be directed from the first end to the second end in the first direction while reflecting the synthesized light between the first surface and the second surface, so that the synthesized light is emitted via a light-emitting section toward the first side in the second direction;
the first dichroic mirror is positioned obliquely to a light-emitting surface of the first display panel and a light-emitting surface of the second display panel as viewed in a third direction, which is perpendicular to the first direction and the second direction;
the second dichroic mirror is positioned obliquely to the light-emitting surface of the second display panel and a light-emitting surface of the third display panel as viewed in the third direction; and
both (i) a first angle formed between the first dichroic mirror and the light-emitting surface of the first display panel as viewed in the third direction and (ii) a second angle formed between the second dichroic mirror and the light-emitting surface of the third display panel as viewed in the third direction are less than 45°.

7. A display apparatus comprising:
a first display panel having a plurality of pixels and configured to emit a nonpolarized first display light;
a second display panel having a plurality of pixels and configured to emit a nonpolarized second display light in a wavelength range different from that of the first display light;
a third display panel having a plurality of pixels and configured to emit a nonpolarized third display light in a wavelength range different from that of the first display light and the second display light;
a synthesis optical system which is a dichroic prism in which a first dichroic mirror and a second dichroic mirror are positioned to intersect with each other, the synthesis optical system including:
  the first dichroic mirror that reflects the first display light and passes the second display light and the third display light; and
  the second dichroic mirror that reflects the third display light and passes the first display light and the second display light;

a plate-shaped light guiding section which has:
  a first surface extending from a first end to a second end in a first direction; and
  a second surface facing the first surface on a first side in a second direction, which is perpendicular to the first direction, and extending from the first end to the second end in the first direction, wherein:
the plate-shaped light guiding section is configured to guide synthesized light emitted from the synthesis optical system to be directed from the first end to the second end in the first direction while reflecting the synthesized light between the first surface and the second surface, so that the synthesized light is emitted via a light-emitting section toward the first side in the second direction;
the first dichroic mirror is positioned obliquely to a light-emitting surface of the first display panel and a light-emitting surface of the second display panel as viewed in a third direction, which is perpendicular to the first direction and the second direction;
the second dichroic mirror is positioned obliquely to the light-emitting surface of the second display panel and a light-emitting surface of the third display panel as viewed in the third direction;
both (i) a first angle formed between the first dichroic mirror and the light-emitting surface of the first display panel as viewed in the third direction and (ii) a second angle formed between the second dichroic mirror and the light-emitting surface of the third display panel as viewed in the third direction are less than 45°;
the dichroic prism includes:
  a first light-incident surface formed parallel with the light-emitting surface of the first display panel and allows the first display light to be incident;
  a second light-incident surface formed parallel with the light-emitting surface of the second display panel and allows the second display light to be incident;
  a third light-incident surface formed parallel with the light-emitting surface of the third display panel and allows the third display light to be incident; and
  a light-emitting surface formed parallel with the second light-incident surface with a dimension of the first direction being smaller than a dimension of the second light-incident surface; and
the dichroic prism has a trapezoid shape with the first light-incident surface and the third light-incident surface being inclined to the second light-incident surface and the light-emitting surface as viewed in the third direction.

* * * * *